US009835413B2

(12) United States Patent
McDonald et al.

(10) Patent No.: US 9,835,413 B2
(45) Date of Patent: *Dec. 5, 2017

(54) BALLISTIC RANGING METHODS AND SYSTEMS FOR INCLINED SHOOTING

(75) Inventors: William True McDonald, Darby, MT (US); Ted C. Almgren, Darby, MT (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,874

(22) Filed: May 7, 2012

(65) Prior Publication Data

US 2012/0217300 A1    Aug. 30, 2012

Related U.S. Application Data

(63) Continuation of application No. 12/952,121, filed on Nov. 22, 2010, now Pat. No. 8,172,139.

(51) Int. Cl.
    G06G 7/80    (2006.01)
    F41G 3/02    (2006.01)

(52) U.S. Cl.
    CPC ..................... F41G 3/02 (2013.01)

(58) Field of Classification Search
    USPC .......................... 235/404, 405, 414
    See application file for complete search history.

(56) References Cited

U.S. PATENT DOCUMENTS 1,190,121 A     7/1916  Critchett
2,806,287 A    11/1955  Sullivan
(Continued)

FOREIGN PATENT DOCUMENTS

| DE | 19949800 A1 | 4/2001 |
|---|---|---|
| EP | 1748273 A1 | 1/2007 |
| EP | 1772695 A1 | 4/2007 |
| GB | 2225844 A | 6/1990 |
| GB | 2294133 A | 4/1996 |
| WO | 93/20399 A1 | 10/1993 |
| WO | 2006/060489 A2 | 6/2006 |
| WO | 2007/133277 A2 | 11/2007 |
| WO | 2007/133277 A3 | 11/2007 |

OTHER PUBLICATIONS

E.P. Woslum, The Saga of the Uphill/Downhill Shot, Part I, copyright 2010, downloaded from http://www.longrangehunting.com/articles/uphill-downhill-shot-1-1.php on Feb. 22, 2012, 3 pages.

(Continued)

*Primary Examiner* — Daniel Hess
(74) *Attorney, Agent, or Firm* — Stoel Rives LLP

(57) ABSTRACT

A portable system for facilitating inclined shooting of projectile weapons comprises a ranging system, an inclinometer and a processor. The ranging system measures a line-of-sight range distance from a vantage point to a target that is elevated or depressed relative to the vantage point, and the inclinometer measures an inclination angle of a line of sight between the vantage point and the target. Based on information from the rangefinder and inclinometer, the processor determines a predicted altitude-compensated inclined shooting (ACIS) trajectory at the line-of-sight range distance for a preselected projectile. The ACIS trajectory is based on a bullet path height correction between a bullet path height at a first altitude and a bullet path height at a second altitude, a range distance of the target from the vantage point, and selected meteorological atmospheric information.

20 Claims, 10 Drawing Sheets

(56) References Cited

U.S. PATENT DOCUMENTS

| | | |
|---|---|---|
| 3,190,003 A | 6/1965 | O'Brien |
| 3,392,450 A | 7/1968 | Herter et al. |
| 3,431,652 A | 3/1969 | Leatherwood |
| 3,492,733 A | 2/1970 | Leatherwood |
| 3,682,552 A | 8/1972 | Hartman |
| 3,744,133 A | 7/1973 | Fukushima et al. |
| 3,782,822 A | 1/1974 | Spence |
| 3,798,796 A | 3/1974 | Stauff et al. |
| 3,845,276 A | 10/1974 | Kendy et al. |
| 3,876,304 A | 4/1975 | Novak |
| 3,902,251 A | 9/1975 | Ross |
| 3,948,587 A | 4/1976 | Rubbert |
| 3,990,155 A | 11/1976 | Akin, Jr. et al. |
| 3,997,762 A | 12/1976 | Ritchie et al. |
| 4,004,729 A | 1/1977 | Rawicz et al. |
| 4,011,789 A | 3/1977 | Bresee, Jr. et al. |
| 4,014,482 A | 3/1977 | Esker et al. |
| 4,038,521 A | 7/1977 | Baumann |
| 4,145,952 A | 3/1979 | Tye |
| 4,247,161 A | 1/1981 | Unertl, Jr. |
| 4,248,496 A | 2/1981 | Akin, Jr. et al. |
| 4,255,013 A | 3/1981 | Allen |
| 4,263,719 A | 4/1981 | Murdoch |
| 4,285,137 A | 8/1981 | Jennie |
| 4,302,666 A | 11/1981 | Hawkins |
| 4,317,650 A | 3/1982 | Lee et al. |
| 4,356,758 A | 11/1982 | Teiling |
| 4,365,149 A | 12/1982 | Falbel |
| 4,395,096 A | 7/1983 | Gibson |
| 4,403,421 A | 9/1983 | Shepherd |
| 4,408,842 A | 10/1983 | Gibson |
| 4,409,468 A | 10/1983 | Mayer et al. |
| 4,494,198 A | 1/1985 | Smith et al. |
| 4,497,548 A | 2/1985 | Burris |
| 4,531,052 A | 7/1985 | Moore |
| 4,568,823 A | 2/1986 | Diehl et al. |
| 4,584,776 A | 4/1986 | Shepherd |
| 4,627,171 A | 12/1986 | Dudney |
| 4,647,759 A | 3/1987 | Worsham et al. |
| 4,698,489 A | 10/1987 | Hickin et al. |
| 4,777,352 A | 10/1988 | Moore |
| 4,787,291 A | 11/1988 | Frohock, Jr. |
| 4,912,853 A | 4/1990 | McDonnell et al. |
| 4,949,089 A | 8/1990 | Ruszkowski, Jr. |
| 4,965,439 A | 10/1990 | Moore |
| 5,026,158 A | 6/1991 | Golubic |
| 5,033,219 A | 7/1991 | Johnson et al. |
| 5,194,908 A | 3/1993 | Lougheed et al. |
| 5,262,838 A | 11/1993 | Tocher |
| 5,291,262 A | 3/1994 | Dunne |
| 5,294,110 A | 3/1994 | Jenkins et al. |
| 5,375,072 A | 12/1994 | Cohen |
| 5,386,308 A | 1/1995 | Michel et al. |
| 5,454,168 A | 10/1995 | Langner |
| 5,469,414 A | 11/1995 | Okamura |
| 5,483,336 A | 1/1996 | Tocher |
| 5,491,546 A | 2/1996 | Wascher et al. |
| 5,568,152 A | 10/1996 | Janky et al. |
| 5,631,654 A | 5/1997 | Karr |
| 5,672,840 A | 9/1997 | Sage et al. |
| 5,740,037 A | 4/1998 | McCann et al. |
| 5,745,287 A | 4/1998 | Sauter |
| 5,771,623 A | 6/1998 | Pernstich et al. |
| 5,781,505 A | 7/1998 | Rowland |
| 5,806,020 A | 9/1998 | Zykan |
| 5,824,942 A | 10/1998 | Mladjan et al. |
| 5,892,617 A | 4/1999 | Wallace |
| 5,914,775 A | 6/1999 | Hargrove et al. |
| 5,920,995 A | 7/1999 | Sammut |
| 6,025,908 A | 2/2000 | Houde-Walter |
| 6,032,374 A | 3/2000 | Sammut |
| 6,064,196 A | 5/2000 | Oberlin et al. |
| 6,094,304 A | 7/2000 | Wallace et al. |
| 6,196,455 B1 | 3/2001 | Robinson |
| 6,252,706 B1 | 6/2001 | Kaladgew |
| 6,269,581 B1 | 8/2001 | Groh |
| 6,516,699 B2 | 2/2003 | Sammut et al. |
| 6,583,862 B1 | 6/2003 | Perger |
| 6,634,112 B2 | 10/2003 | Carr et al. |
| 6,813,025 B2 | 11/2004 | Edwards |
| 6,862,832 B2 | 3/2005 | Barrett |
| 6,873,406 B1 | 3/2005 | Hines et al. |
| 6,886,287 B1 | 5/2005 | Bell et al. |
| 6,955,296 B2 | 10/2005 | Lusher et al. |
| 6,978,569 B2 | 12/2005 | Williamson, IV et al. |
| 7,143,681 B2 | 12/2006 | Hartmann et al. |
| 7,171,776 B2 | 2/2007 | Staley, III |
| 7,239,377 B2 | 7/2007 | Vermillion et al. |
| 7,275,691 B1 | 10/2007 | Wright et al. |
| 7,472,830 B2 | 1/2009 | Danielson |
| 7,500,423 B2 | 3/2009 | Strand |
| 7,501,979 B1 | 3/2009 | Guice et al. |
| 7,597,041 B2 | 10/2009 | Gerstadt et al. |
| 7,654,029 B2 | 2/2010 | Peters et al. |
| 7,690,145 B2 | 4/2010 | Peters et al. |
| 7,703,679 B1 | 4/2010 | Bennetts et al. |
| 7,748,155 B2 | 7/2010 | Cole |
| 7,937,879 B2 | 5/2011 | Hamilton |
| 8,172,139 B1 * | 5/2012 | McDonald et al. ......... 235/404 |
| 2002/0129535 A1 | 9/2002 | Osborn, II |
| 2004/0020099 A1 | 2/2004 | Osborn, II |
| 2004/0025396 A1 | 2/2004 | Schlierbach et al. |
| 2004/0088898 A1 | 5/2004 | Barrett |
| 2004/0212878 A1 | 10/2004 | Regan et al. |
| 2004/0231220 A1 | 11/2004 | McCormick |
| 2005/0021282 A1 | 1/2005 | Sammut et al. |
| 2005/0039370 A1 | 2/2005 | Strong |
| 2005/0046706 A1 | 3/2005 | Sesek et al. |
| 2005/0198885 A1 | 9/2005 | Staley, III |
| 2005/0229468 A1 | 10/2005 | Zaderey et al. |
| 2005/0252062 A1 | 11/2005 | Scrogins et al. |
| 2005/0268521 A1 | 12/2005 | Cox et al. |
| 2006/0010760 A1 | 1/2006 | Perkins et al. |
| 2006/0048432 A1 | 3/2006 | Staley, III |
| 2006/0077375 A1 | 4/2006 | Vermillion et al. |
| 2006/0096149 A1 | 5/2006 | Wooden |
| 2006/0101700 A1 | 5/2006 | Williamson, IV et al. |
| 2007/0018070 A1 | 1/2007 | Dames |
| 2007/0097351 A1 | 5/2007 | York et al. |
| 2007/0137088 A1 | 6/2007 | Peters et al. |
| 2007/0137090 A1 | 6/2007 | Conescu |
| 2007/0137091 A1 | 6/2007 | Cross et al. |
| 2009/0123894 A1 | 5/2009 | Svane et al. |
| 2009/0139393 A1 | 6/2009 | Quinn |
| 2009/0188976 A1 | 7/2009 | Gunnarsson et al. |
| 2009/0200376 A1 | 8/2009 | Peters et al. |
| 2009/0212108 A1 | 8/2009 | Rothe et al. |
| 2009/0218400 A1 | 9/2009 | Boss et al. |
| 2009/0265974 A1 | 10/2009 | Joannes |
| 2010/0275768 A1 | 11/2010 | Quinn |
| 2010/0282845 A1 | 11/2010 | Peters et al. |
| 2011/0030264 A1 | 2/2011 | Davidson et al. |
| 2011/0173869 A1 | 7/2011 | Uhm |

OTHER PUBLICATIONS

Stello et al., H613, Apr. 4, 1989.
W.T. McDonald, Inclined Fire, Jun. 2003, downloaded from www.exteriorballistics.com on Nov. 18, 2010, 9 pages.
R.H. Shudde, Nonsymmetric Ballistic Range, Height, Time-of-Flight, and Optimal Flight Path Angle Computations for a Lewett-Packard 65 Calculator, downloaded from http://stinet.dtic.mil/ on Apr. 24, 2007, 1 page.
U.S. Appl. No. 60/552,262 to Staley, III, filed Mar. 10, 2004, 27 pages.

* cited by examiner

BALLISTIC RANGING METHODS AND SYSTEMS FOR INCLINED SHOOTING

CROSS-REFERENCE TO RELATED PATENT APPLICATION

The present patent application is a continuation patent application of U.S. patent application Ser. No. 12/952,121, by William T. McDonald et al., entitled "Ballistic Ranging Methods and Systems For Inclined Shooting," and filed Nov. 22, 2010, now U.S. Pat. No. 8,172,139, the disclosure of which is incorporated by reference herein.

BACKGROUND

The subject matter disclosed herein relates to methods and systems for compensating for ballistic drop and to portable devices (such as various equipments embodying various target locating and designators) implementing such methods. More particularly, the subject matter disclosed herein relates to method and system for compensating for ballistic drop for inclined shooting and to rangefinders and other portable devices implementing such methods.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

The word "exemplary," as used herein, means "serving as an example, instance, or illustration." Any embodiment described herein as "exemplary" is not to be construed as necessarily preferred or advantageous over other embodiments. Also, six technical terms used repeatedly herein require explanation. These terms are "ballistic path," "bullet path," "arrow path," "ballistic path height," "bullet path height," and "arrow path height." A projectile flying through the air without propulsion follows a ballistic trajectory, which may also be called a "ballistic path." Two types of projectiles are addressed herein, bullets from firearms and arrows from bows. Thus, the "ballistic path" of a bullet is a "bullet path," and similarly, the "ballistic path" of an arrow is an "arrow path". When the word "height" is added to any of these terms (e.g., "bullet path height"), it refers specifically to the perpendicular distance between the instantaneous position of the projectile (e.g., the bullet) in flight and the extended line of sight of a shooter through the sighting device on the weapon which launched the projectile. The path height is considered positive when the projectile is above the extended line of sight, and negative when the projectile is below the extended line of sight.

Figure 1:
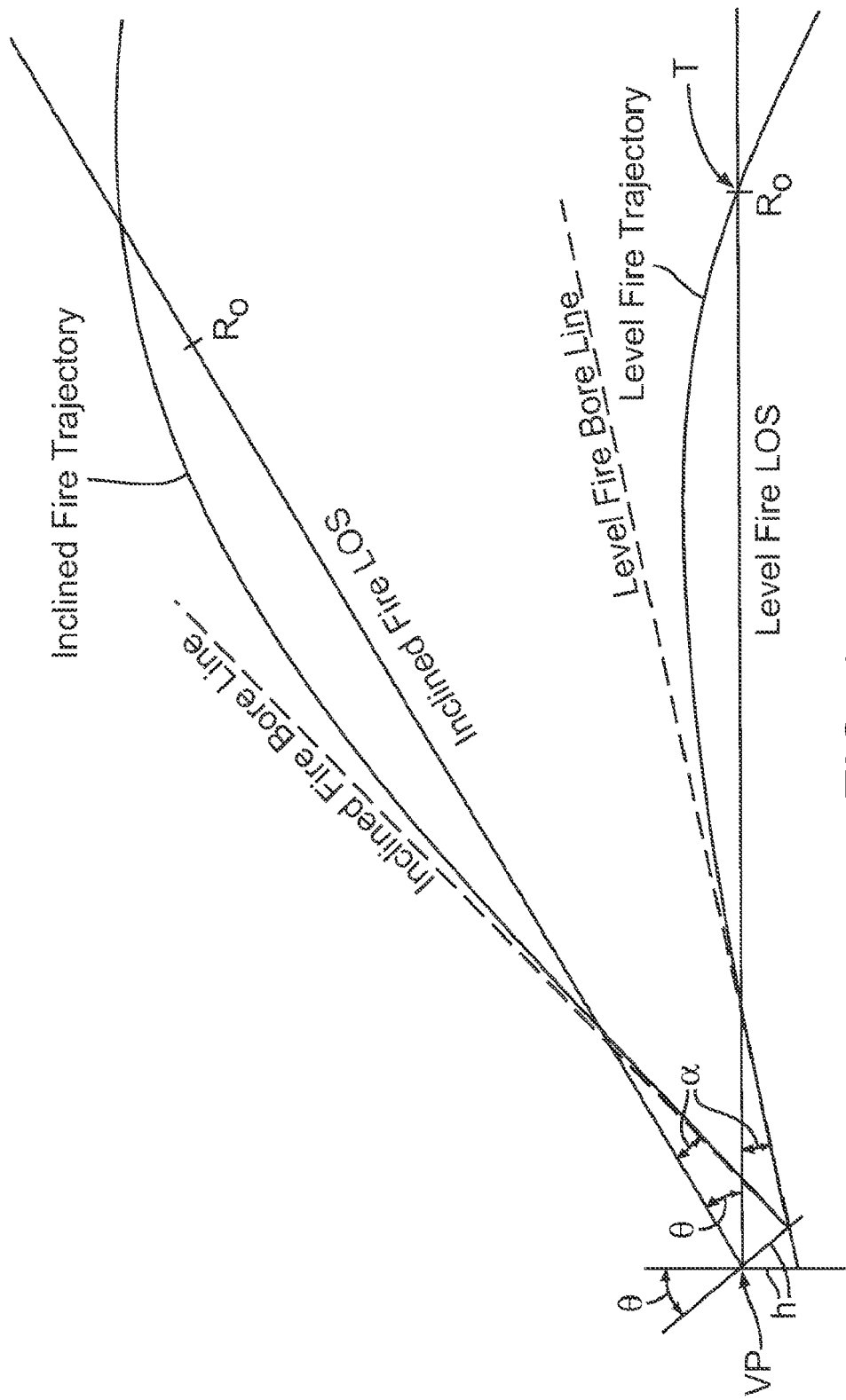
FIG. 1 depicts a schematic diagram of level-fire and inclined-fire trajectories for a projectile.

FIG. 1 depicts a schematic diagram illustrating the effect on the trajectory of a projectile of the inclination of the line along which projectile is fired, cast, or otherwise launched (the "line of initial trajectory" or, in the case of guns, the "bore line"). For purposes of illustration, the trajectory curves and angles between various lines in FIG. 1 are greatly exaggerated and are not to scale.

With reference to FIG. 1, a "level fire" trajectory is the path along which a projectile moves when shot at a target T at range $R_0$ and at substantially the same geographic elevation as a vantage point VP of the shooter. The weapon launching the projectile has a line of initial trajectory ("level-fire bore line") that is not actually level, but rather is inclined relative to the level-fire line of sight (level-fire LOS) by an elevation angle $\alpha$. The angle $\alpha$ is quite small, typically about one minute of angle (MoA) for a firearm, and larger (several MoA) for a bow. The level-fire line of sight, which is therefore approximately horizontal, begins at a height h above the beginning of the bore line. The height h and elevation angle $\alpha$ represent the typical mounting arrangement of a sighting device (i.e., riflescope, open sights, etc.) on a firearm or an archery sight on a bow. The level-fire trajectory intersects the level-fire line of sight at range $R_0$ and is known as the "sighted-in range" or "zero range" or "zeroed-in range" (also referred to herein as zero-range distance $R_Z$) of the weapon and sight combination. The sighted-in range $R_0$ is typically established by shooting the weapon at a target at a known horizontal reference distance $R_0$, such as 100 yards, and adjusting the elevation angle $\alpha$ of the riflescope or other sighting device until projectiles shot by the weapon impact the target at a point that coincides with the cross hairs or other aiming mark of the riflescope or other sighting device.

An "inclined-fire trajectory" is also depicted in FIG. 1. The inclined-fire trajectory represents the path along which the same projectile travels when aimed at a target that is elevated relative to vantage point VP. The height h and elevation angle α of the inclined-fire line of sight relative to the bore line are the same as in the level-fire scenario, because there can be no adjustment to the sighting device on the firearm or bow to anticipate the target elevation in the field. The inclined-fire line of sight will be inclined by an angle of inclination θ. As illustrated in FIG. 1, the inclined-fire trajectory crosses the inclined-fire line of sight at a distance substantially greater than the sighted-in range $R_0$. This overshoot is due to the effect of gravity, which always acts in the vertically downward direction, regardless of the angle of inclination θ. The overshoot phenomena and prior methods of correcting for it are discussed in detail by W. T. McDonald in his paper titled "Inclined Fire" (June 2003), available from sierrabullets.com. The effects of inclination are typically even more pronounced in archery than for bullets and are caused by differences in the initial speed and aerodynamic characteristics of the projectiles used. The line-of-sight range distance and the inclination angle of a target relative to the shooter may be measured or estimated in the field where the target is encountered.

In accordance with exemplary embodiments described herein, many hunters (including bow hunters) and other shooters, such as military and law enforcement snipers, are versed in holdover techniques for compensating for ballistic drop in horizontal fire scenarios. A holdover adjustment involves aiming high by a measured or estimated amount. For example, a countersniper shooting a rifle with a riflescope sighted in at 200 yards may know that a killing shot for his target (in the heart-lung area) at a level-fire range of approximately 375 yards involves aiming the cross hairs of the riflescope at the top of the target's head. Holdover adjustments are much faster in practice than elevation adjustments, which involve manually adjusting an elevation setting of the riflescope or other aiming device to change the elevation angle α of the aiming device relative to the weapon. Holdover adjustments are also the primary mode of aiming adjustment for most archers. Holdover and holdunder techniques also avoid the need to re-zero the aiming device after making a temporary elevation adjustment.

Many varieties of ballistic reticles are employed in riflescopes to facilitate holdover and holdunder. For archery, a common ballistic aiming sight, known as a pin sight, is often employed for holdover aiming adjustment. Ballistic reticles and other ballistic aiming sights generally include multiple aiming marks spaced apart along a vertical axis. Exemplary ballistic reticles include mil-dot reticles and variations, such as the LEUPOLD TACTICAL MILLING RETICLE™ (TMR™) available from Leupold & Stevens, Inc., Leupold® DUPLEX™ reticles; the LEUPOLD SPECIAL PURPOSE RETICLE™ (SPR™); and LEUPOLD BALLISTIC AIMING SYSTEM™ (BAS™) reticles, such as the LEUPOLD BOONE & CROCKETT BIG GAME RETICLE™ and the LEUPOLD VARMINT HUNTER'S RETICLE™ BAS reticles and methods of using them are described in U.S. Pat. No. 7,603,804 B2 to Zaderey et al., entitled "Ballistic Reticle for Projectile Weapon Aiming Systems and Method of Aiming" ("the '804 patent"), the disclosure of which is incorporated herein by reference. As described in the '804 patent, BAS reticles include secondary aiming marks that are spaced at progressively increasing distances below a primary aiming mark and positioned to compensate for ballistic drop at preselected regular incremental ranges for a group of ammunition having similar ballistic characteristics.

Figure 2:
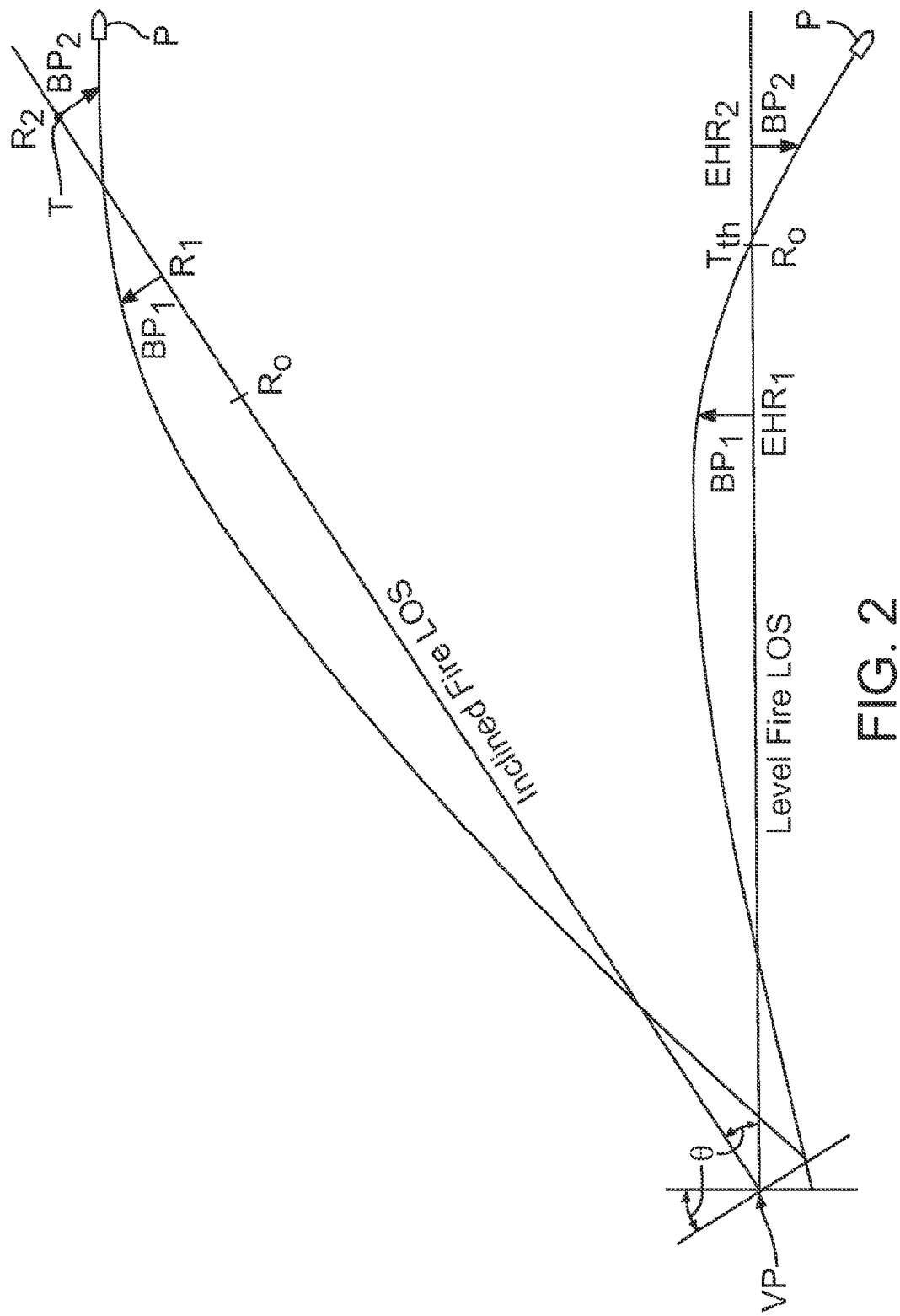
FIG. 2 depicts a schematic diagram illustrating measurements and factors in calculating an Equivalent Horizontal Range.
Figure 3:
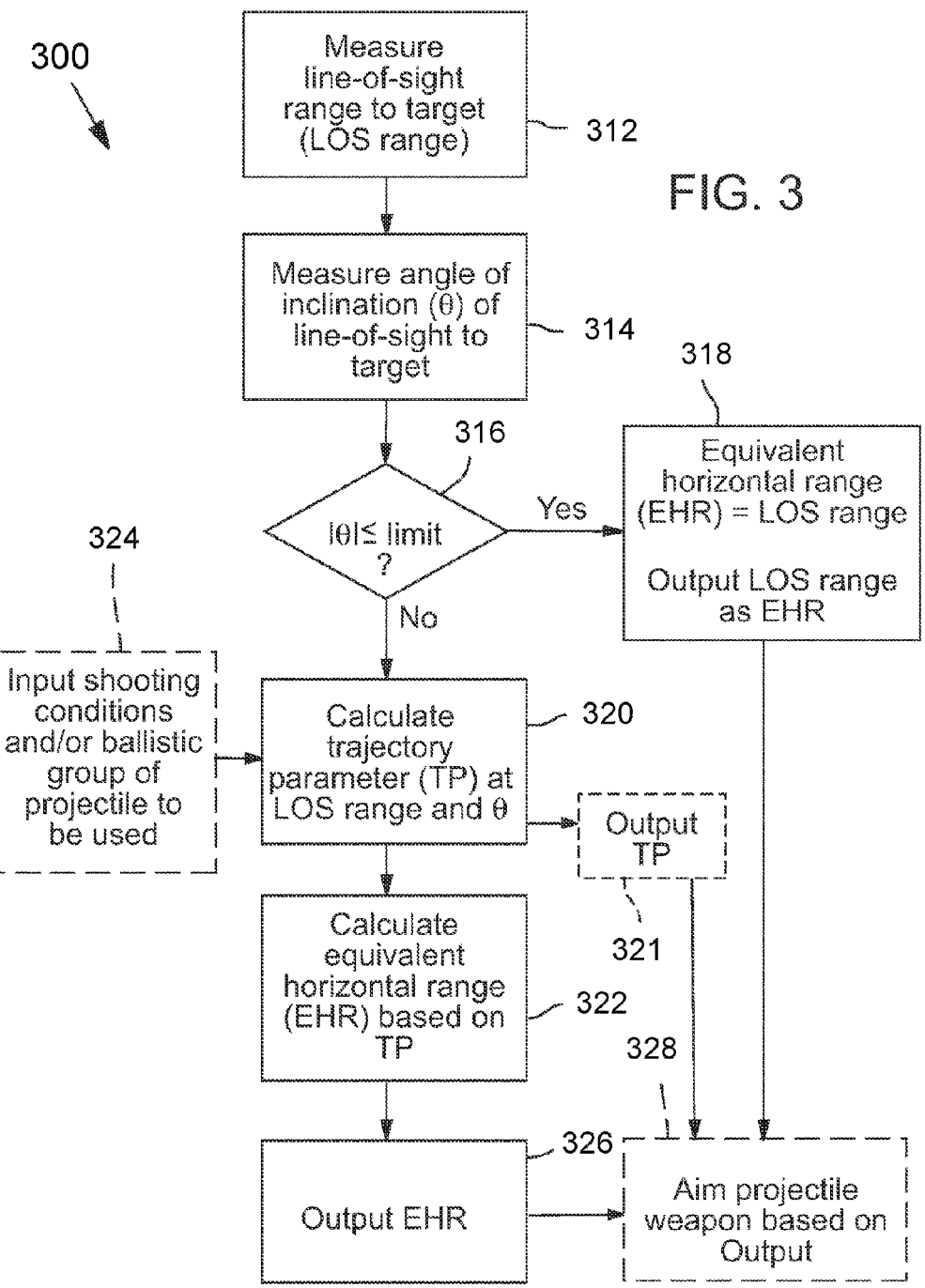
FIG. 3 depicts a flow chart for one exemplary embodiment of a method for determining the Equivalent Horizontal Range for accurately aiming a projectile weapon at an elevated or depressed target located at a inclined line of sight.

In accordance with one exemplary embodiment depicted in FIGS. 2 and 3, a method 300 of inclined shooting involves calculation of an equivalent horizontal range (EHR) that may be used by a shooter to make a holdover or elevation adjustment for accurately aiming a projectile weapon at an elevated or depressed target located at a inclined line-of-sight (LOS) range that is different from the EHR. With reference to FIG. 2, a shooter at vantage point VP determines a line-of-sight range to a target. As in FIG. 1, a zero range $R_0$ represents the horizontal-fire distance at which the trajectory of the projectile launched from the projectile weapon and the line of sight from the aiming device of the weapon intersect. Line-of-sight ranges $R_1$ and $R_2$ to two different targets are depicted in FIG. 2, illustrating the usefulness of the method with respect to both positive and negative ballistic path heights $BP_1$ and $BP_2$ relative to the inclined-fire LOS. For purposes of illustration, the steps of method 300 (FIG. 3) will be described with reference to a generic LOS range R to a target T, shown in FIG. 2 at range $R_2$. It should be appreciated that the methods described herein are equally applicable to "near" LOS ranges $R_1$ at which the ballistic path height $BP_1$ is positive, as well as to "far" LOS ranges $R_2$ at which the ballistic path height $BP_2$ is negative. The LOS range R may be determined by a relatively accurate ranging technique, such as use of a lidar (laser ranging) or radar, or by a method of range estimation, such as optical range estimating methods in which a distant target of known size is bracketed in a scale of an optical device, as described in the '804 patent.

Methods 300 in accordance with the present disclosure also involve determining an inclination θ of the inclined LOS between vantage point VP and the target F. The angle of inclination θ may be determined by an electronic inclinometer, calibrated tilt sensor circuit, or other similar device. For accuracy, ease of use, and speed, an electronic inclinometer for determining the angle of inclination θ may be mounted in a common housing with a handheld laser rangefinder 800 of the kind described below with reference to FIGS. 8-10.

FIG. 3 is a flow diagram depicting steps of inclined shooting method 300, including the initial steps of determining the LOS range R (step 312) and determining the inclination θ of the inclined LOS (step 314). With reference to FIG. 3, after LOS range R and inclination θ have been determined (steps 312 and 314), method 300 may involve a check (step 316) to determine whether the absolute value of inclination θ is less than a predetermined limit under which the effects of inclination can be disregarded and the LOS range R can be regarded as the Equivalent Horizontal Range (EHR) (step 318).

Archery ballistics exhibit a more significant difference between positive and negative lines of initial trajectory (uphill and downhill shots) because the initial velocity is relatively low, giving the effects of gravity more time to affect the trajectory over a given distance than with bullets, which reach their targets much faster than arrows. Especially at long ranges, uphill shots experience more drop than downhill shots; therefore, when applying method 300 for archery, check 316 may involve comparing a positive inclination θ against a positive limit and a negative inclination θ against a negative limit that is different from the positive limit. Mathematically, such a check would be expressed as: {lower_limit}>θ<{upper_limit}?

If the result of check 316 is negative, then a predicted trajectory parameter TP is calculated or otherwise determined at the LOS range for a preselected projectile P shot from vantage point VP toward the target T (step 320). Trajectory parameter TP may comprise any of a variety of trajectory characteristics or other characteristics of a projectile that are calculable using ballistics software. For example, trajectory parameter TP at LOS range R may comprise one or more of ballistic path height (e.g., arrow path or bullet path), ballistic drop relative to line of initial trajectory (e.g., the bore line in FIG. 1), observed ballistic drop perpendicular to LOS (i.e., (vertical ballistic drop) $\cos(\theta+\alpha)$), velocity, energy, and momentum. In accordance with the exemplary embodiment described below with reference to FIGS. 2 and 4, for $R=R_2$, trajectory parameter TP may comprise ballistic path height $BP_2$ (e.g., bullet path height). In another embodiment, described below with reference to FIG. 5, the trajectory parameter of ballistic path height comprises arrow path height (AP).

Nothing in the figures or written description should, however, be construed as limiting the scope of possible trajectory parameters to only ballistic path height. Of the many possible choices of trajectory parameters, ballistic path height (bullet path height or arrow path height) usually is best for the shooter, who needs to know where the projectile will be relative to the line of sight when the projectile reaches the line-of-sight range distance to the target so that the shooter can make appropriate aiming adjustments.

After the trajectory parameter TP has been calculated, the method may then output the trajectory parameter TP (step 321) or calculate EHR based on the trajectory parameter TP or parameters (step 322). At step 321, the trajectory parameter TP output may comprise ballistic path height BP expressed as a linear distance in inches or millimeters (mm) of apparent drop, or as a corresponding angle subtended by the ballistic path height (e.g., $BP_2$ in FIG. 2) in minutes of angle (MOA) or milliradians (mils). The TP output (step 321) may comprise a display of numerical ballistic path data in an electronic display device, such as a display 900 (FIG. 9) of rangefinder 800 (FIG. 8) or a reticle in a riflescope. Alternatively or additionally, the TP output (step 321) may comprise a graphical display of a holdover aiming recommendation in a rangefinder display, a riflescope reticle, an archery sight, or another aiming sight, based on the trajectory parameter of ballistic path height BP.

In one exemplary method of calculating EHR, a reference ballistics equation for a level-fire scenario ($\theta=0$) comprising a polynomial series is reverted (i.e., through series reversion) to solve for EHR based on a previously calculated ballistic path height BP ($BP_2$). As depicted in FIG. 2, $BP_2$ corresponds to $EHR_2$ under level-fire conditions. Thus, EHR is calculated as the range at which trajectory parameter TP would occur if shooting projectile P in a level-fire condition from the vantage point VP toward a theoretical target $T_{th}$ in a common horizontal plane with vantage point VP, such that the horizontal plane coincides with the level-fire LOS. The reference ballistics equation may be established to deviate slightly from horizontal without appreciable error. Consequently, the terms "horizontal," "level-fire LOS," and other similar terms are construed to allow for equations to deviate from perfect horizontal unless the context indicates otherwise. For example, when solving for EHR, the degree of levelness of the reference equations should facilitate calculation of EHR with sufficient accuracy to allow aiming adjustments for inclined shooting resulting in better than ±6 inches of error at 500 yards throughout the range of between −60 and +60 degrees inclination. Ballistic trajectories are generally flatter at steeper shooting angles and trajectories of different projectiles are therefore more similar. Consequently, the deviation tends to be less significant at very steep inclines.

The calculation of trajectory parameter TP, the calculation of equivalent horizontal range EHR, or both, may also be based on a ballistic coefficient of the projectile P and one or more shooting conditions. The ballistic coefficient and shooting conditions may be specified by a user or automatically determined at step 324. Automatically-determined shooting conditions may include meteorological conditions, such as temperature, relative humidity, and/or barometric pressure, which may be measured by micro-sensors in communication with a computer processor for operating method 300. Meteorological conditions may also be determined by receiving local weather data via radio transmission signal, received by an antenna and receiver in association with the computer processor. Similarly, geospatial shooting conditions, such as the compass heading of the LOS to the target and the geographic location of the vantage point VP (including latitude, longitude, altitude, or all three), may be determined automatically by a GPS receiver and an electronic compass sensor in communication with the computer processor, to ballistically compensate for the Coriolis effect (caused by the rotation of the Earth). Alternatively, such meteorological and geospatial shooting conditions may be specified by a user and input into a memory associated with the computer processor, based on observations made by the user. It may be noted that for bows, geospatial conditions are unnecessary because maximum range distances are short, while for high-powered rifles, Coriolis corrections to a trajectory are necessary only if range distances exceed about 1000 yards or meters.

User selection of shooting conditions and ballistic coefficient may also involve preselecting or otherwise inputting non-meteorological and non-geospatial conditions for storage in a memory associated with a computer processor on which method 300 is executed. The ballistic coefficient and certain shooting conditions, such as the initial velocity of projectile P (e.g., muzzle velocity, in the case of bullets), may be set by a user simply by selecting from two or more weapon types (such as guns and bows), and from two or more ballistic groupings and possibly three, four, five, six, seven or more groups, such that each group has a nominal ballistic characteristic representative of different sets of projectiles having similar ballistic properties. The sets groups) may be mutually-exclusive or overlapping (intersecting). A sighted-in range of a weapon aiming device and a height of the weapon aiming device above a bore line of a weapon may also be entered in this manner. In a rangefinder device 800 for operating the method, described below with reference to FIGS. 8 and 9, the weapon type and ballistic group may be selected from a menu of possible choices during a menu mode or setup mode of rangefinder device 800.

After a trajectory parameter TP has been calculated at step 320 or EHR has been calculated at step 322, method 300 then involves outputting TP or EHR in some form (step 321 or 326). For example, TP or EHR may be displayed via a display device, such as an LCD display, in the form of a numeric value specified in a convenient unit of measure. For example, TP output may be expressed as ballistic path height BP in inches or mm of apparent drop or as an angle (in MOA or mils) subtended by the ballistic path height BP. EHR may be expressed in yards or meters, for example. In other embodiments, BP or EHR may be effectively output via a graphical representation of the data through the identification of a reticle aiming mark corresponding to the holdover or holdunder (holdover or holdunder is always the negative of the BP), or the EHR, for example, as described below.

Once EHR is output at 326, EHR can then be employed to aim the projectile weapon at target T (step 328) along the inclined LOS at $R_2$. In one embodiment, a shooter merely makes a holdover or holdunder adjustment based on the calculated EHR, as if he or she were shooting under level-fire conditions—it being noted that wind effects, firearm inaccuracy, and wiggle of the shooter are still in effect over the entire LOS range $R_2$. In another embodiment, the shooter adjusts an elevation adjustment mechanism of a riflescope or other aiming device based on the displayed EHR. Similar elevation adjustments may be made based on the display of the calculated trajectory parameter TP (step 321).

Figure 4:
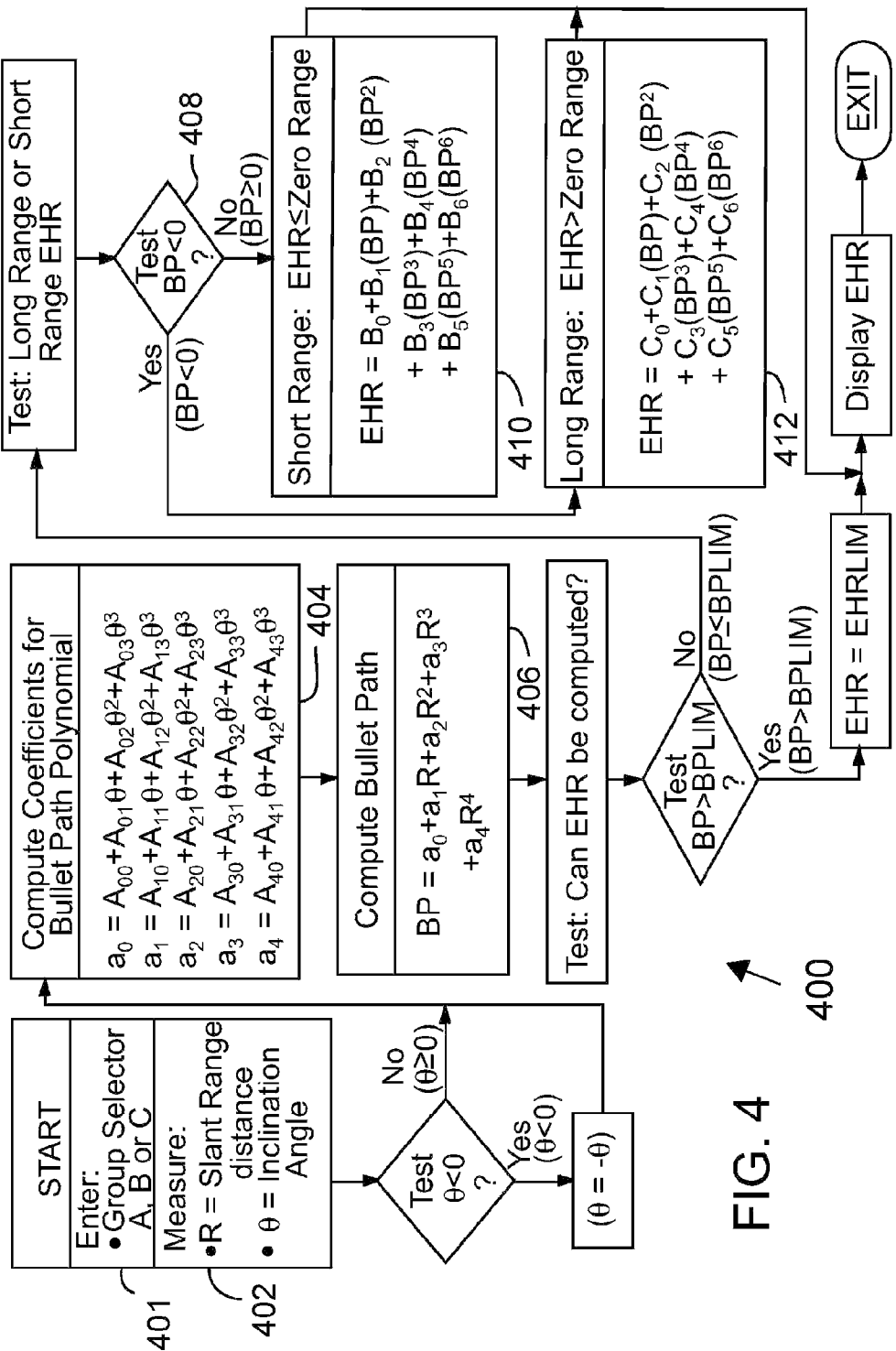
FIG. 4 depicts a summary of one exemplary method for calculating a trajectory parameter of bullet path and Equivalent Horizontal Range for bullets.

FIG. 4 summarizes details of one possible sequence of steps 400 for calculating a trajectory parameter of bullet path height (BP) and equivalent horizontal range (EHR) for bullets. The calculation sequence 400 begins with selection of a ballistic group (A, B, or C) in which the bullet and cartridge are listed (step 401). Ballistic grouping may effectively normalize groups of bullets having similar characteristics, based on their ballistic coefficients, muzzle velocities and masses. Listings of cartridges in the various groupings may be provided to the user by a printed table or software-generated information display, facilitating selection of the appropriate ballistic group. Reference trajectories for ballistic groups A, B, and C are set forth in Table 1. The other inputs to the calculations include the LOS range R and the inclination angle θ, which may be determined automatically by a handheld laser rangefinder with inclinometer (step 402). The calculation method involves solving the following polynomial equation for bullet path height BP:

$$BP = a_0 + a_1 R + a_2 R^2 + a_3 R^3 + a_4 R^4 \quad (1)$$

(step 406), in which the coefficients $a_0, a_1, a_2, a_3$ and $a_4$ are calculated from the inclination angle θ based on a series of polynomial equations 404 in which the coefficients thereof (identified in FIG. 4 as $A_{00}, A_{01}, A_{02}$, etc.) are different stored parameters for each ballistic group A, B, and C. A single equation 406 (Equation (1)) is suitable for both positive and negative angles of inclination, expressed as absolute angular values. After bullet path height BP has been determined, the BP is then used as an input to one of two different reversions of the bullet path equation for θ=0 to solve for EHR. If bullet path height BP is positive (test 408), then a "short-range EHR" polynomial equation is used (step 410), such that $B_0, B_1, \ldots, B_6$ are parameters corresponding to the selected ballistic group. If BP is negative (test 408), then a "long-range EFIR" polynomial equation is used (step 412), such that $C_0, C_1, \ldots, C_6$ are parameters corresponding to the selected ballistic group. Each ballistic group also has an associated coefficient named BPLIM, which is an upper limit for BP in the computations shown in FIG. 4. Parameters $A_{00}$ to $A_{43}$, $B_0$ to $B_6$, and $C_0$ to $C_6$ are constants that are stored for each of the ballistic groups and recalled based on the selected ballistic group for purposes completing the calculations 400.

Figure 5:
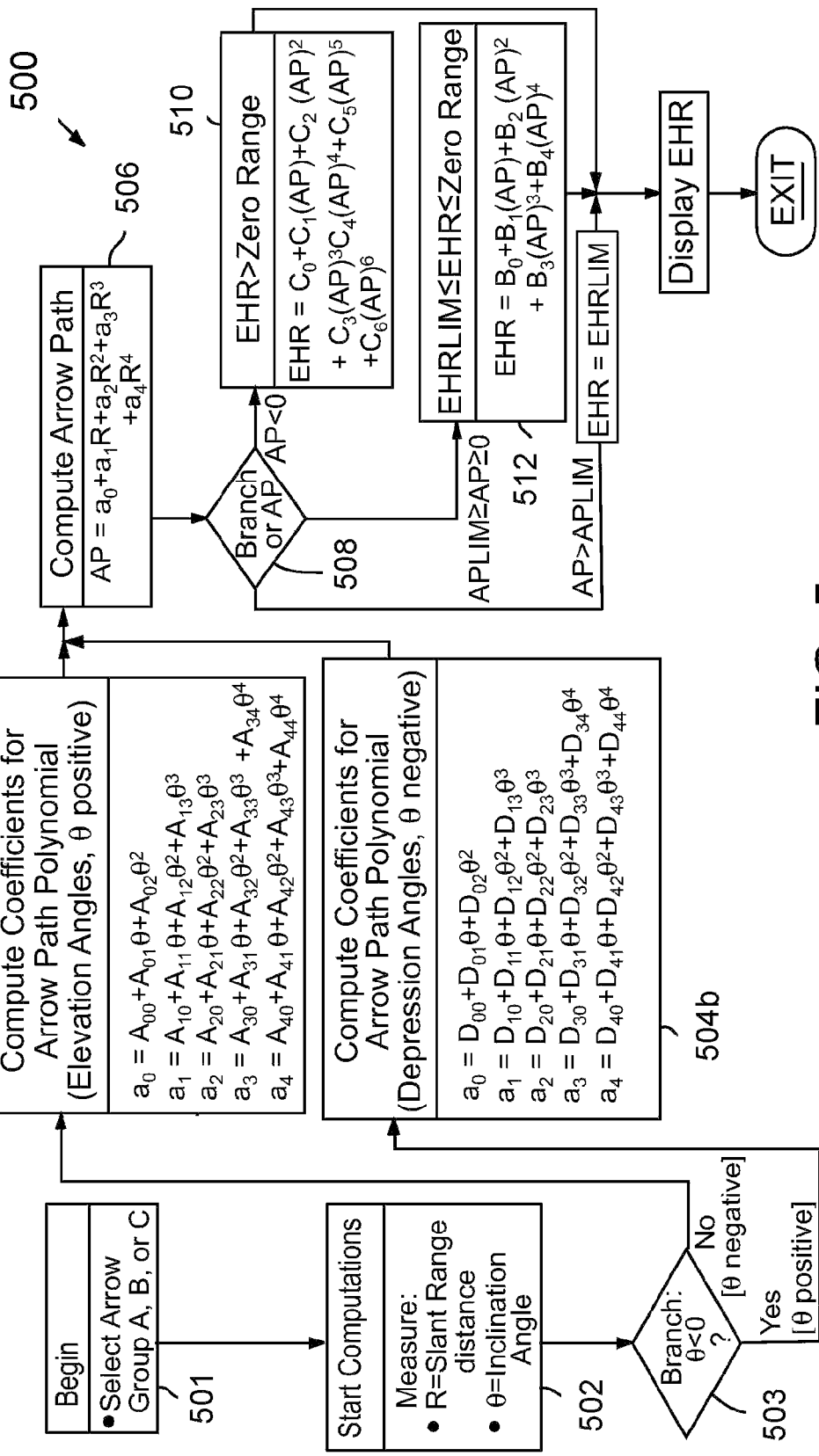
FIG. 5 depicts a summary of one exemplary method for calculating a trajectory parameter of an arrow path and equivalent horizontal range for arrows

FIG. 5 illustrates a similar sequence of calculations 500 for archery. In FIG. 5, reference numerals 501, 502, 506, etc., indicate steps that respectively correspond to steps 401, 402, 406, etc., of FIG. 4. Unlike the calculations 400 (FIG. 4) for bullets, the calculation of ballistic path for arrows 500 (hereinafter arrow path (AP) must take into account whether the inclination angle is positive or negative (branch 503), due to the increased flight time of arrows and attendant increased effects of gravity on their trajectory. For this reason, the calculations involve one of two different sets of coefficients $A_{ij}$ and $D_{ij}$, (for 3, 4, 5 and j=1, 2, 3, 4, 5) depending on whether the inclination is positive ((step 504a') or negative (step 504b'). Parameters $A_{00}$ to $A_{43}$, $B_0$ to $B_6$, $C_0$ to $C_6$, $D_{00}$ to $D_{43}$, APLIM, and EHRLIM are constants that are stored in memory for each of the ballistic groups and recalled based on the selected ballistic group for purposes completing the calculations 500.

Table 1 lists one example of criteria for ballistic grouping of arrows and bullets:

TABLE 1

| BALLISTIC GROUP | CHARACTERISTIC BALLISTIC DROP (WITHOUT INCLINE) |
|---|---|
| Arrow group A | Arrow drop of 20-30 in from the 20 yd sight pin at 40 yd |
| Arrow group B | Arrow drop of 30-40 in from the 20 yd sight pin at 40 yd |
| Arrow group C | Arrow drop of 10-20 in from the 20-yd sight pin at 40 yd |
| Bullet group A | Rifles sighted in at 200 yards with 30-40 in drop at 500 yd |
| Bullet group B | Rifles sighted in at 200 yards with 40-50 in drop at 500 yd |
| Bullet group C | Rifles sighted in at 300 yards with 20-30 in drop at 500 yd |

Arrow groupings may be more dependent on the launch velocity achieved than the actual arrow used, whereas bullet groupings may be primarily based on the type of cartridge and load used. Table 2 lists exemplary reference trajectories from which the calculation coefficients of FIG. 4 may be determined for ballistic groups A, B, and C.

TABLE 2

| BALLISTIC GROUP | REFERENCE TRAJECTORY |
|---|---|
| A | Winchester Short Magnum with Winchester 180 grain Ballistic Silvertip bullet at 3010 fps, having a level fire bullet path height of −25.21 in at 500 yds. |
| B | 7 mm Remington Magnum with Federal 150 grain SBT GameKing bullet at 3110 fps, having a level fire Bullet Path height of −34.82 in at 500 yds. |
| C | 7 mm-08 Remington with Remington Pointed Soft Point Core-Lokt bullet at 2890 fps, having a level fire Bullet Path height of −45.22 in at 500 yds. |

Alternatives to solving a series of polynomial equations also exist, although many of them will not provide the same accuracy as solving a polynomial series. For example, a single simplified equation for ballistic drop or ballistic path height may be used to calculate a predicted trajectory parameter, and then a second simplified equation used to calculate EHR from the predicted trajectory parameter. Another alternative method of calculating EHR involves the "Sierra Approach" described in W. T. McDonald, "inclined Fire" (June 2003), incorporated herein by reference. Still another alternative technique for calculating ballistic drop or ballistic path involves a table lookup of a predicted trajectory parameter and/or interpolation of table lookup results, followed by calculation of EHR using the formula identified in FIG. 4. Yet another alternative involves determining both the predicted trajectory parameter and EHR by table lookup and interpolation, using stored sets of inclined-shooting data at various angles.

Table 3 illustrates an example of an EHR calculation using the sequence of steps for calculating a trajectory parameter of bullet path height (BP) and equivalent horizontal range (EHR) for bullets described above in connection with FIG. 4. The EHR calculations in Table 3 are also compared with the results of aiming using EHR to aiming with no compensation for incline, and aiming by utilizing the horizontal distance to the target (rifleman's rule).

TABLE 3

| LOAD | .300 WSM, 165 GRAIN NOSLER PARTITION, 3050 FPS MUZZLE VELOCITY |
|---|---|
| Angle of inclination | 50° |
| Inclined line-of-sight range | 500 yds |
| Equivalent Horizontal Range (EHR) | 389 yds |
| Ballistic table holdover for 389 yds | 18 in level fire |
| Horizontal leg of the triangle | 321 yds |
| Ballistic table holdover for 321 yds | 8.5 in |
| Error if horizontal leg is used | −9.5 in |
| Ballistic table holdover for 500 yds | 39.5 in level fire (no compensation for incline) |
| Error if no compensation for incline | +21.5 ins |

The subject matter disclosed herein also provides a technique for determining highly accurate trajectories for inclined shooting that accounts for effects to a trajectory caused by altitude. That is, the subject matter disclosed herein also provides a technique for determining highly accurate Altitude-Compensated Inclined Shooting (ACIS) trajectories. According to the subject matter disclosed herein, ACIS trajectories are determined for a specific cartridge type at all target range distances within the maximum effective range of the cartridge, at all positive and negative target inclination angles within ±70 degrees, and at all altitudes above sea level up to a practical maximum for first zeroing-in the firearm and then later firing (at a different altitude) at a target encountered in the field. Additionally, the ACIS trajectories provide a full 3-degree-of-freedom analytical model for trajectory calculations. Moreover, the firearm may be a machine gun, rifle, or handgun using that specific cartridge type. The exemplary ACIS method described herein is described for firearms that shoot bullets. The ACIS method also may be applied to bows shooting arrows, although some modifications are necessary because, as explained above, an arrow trajectory for shooting upward at a positive inclination angle differs from the trajectory for shooting downward at a negative inclination angle of the same value, which is caused by lower velocities and longer times of flight for arrows over a given distance.

The computational procedure for ACIS trajectories utilizes characteristics of known firearm and ammunition, such as projectile ballistic coefficient(s) available from manufacturers' data or other test data, and the muzzle velocity of the firearm. Additionally, the computational procedure utilizes standard meteorological conditions, i.e., standard atmospheric pressure, temperature, and relative humidity versus altitude, which are available from the Army Standard Meteorological Atmosphere ("Army Standard Metro") at the particular altitude at which the firearm is sighted-in (zeroed-in) and at the particular altitude of the firing point in the field. For Army Standard Metro information, see, for example, "Modern Exterior Ballistics," R. L. McCoy, Schiffer Military History, 1999, page 166; "Exterior Ballistics of Small Arms Projectiles," E. D. Lowry, Olin Mathiesin Chemical Corporation, 1965, page 74; and "Sierra Rifle Reloading Manual," $3^{rd}$ Edition, Sierra Bullets L. P., 1989, pages 480-481). The Army Standard Metro atmosphere is the reference for the standard drag functions G1, G5, G6, G7, etc., and the ballistic coefficient value(s) pertaining to each of those drag functions and, consequently, is the reference atmosphere for almost all predictive ballistic computations. Other possibilities exist for atmospheric conditions, such as the International Standard Atmosphere (ISA) or even absolute measurements of temperature, pressure, and humidity at the shooting location, but the Army Standard Metro Atmosphere has been adopted for predictive ballistic computations with commercial ammunition. Altitude information above sea level at the zeroing-in site and at the firing site is obtained from reference data, field measurements, topographical maps, etc. Target conditions (i.e., target direct-range distance and target inclination angle relative to the firing point) are obtained from measurements made in real time when a target is encountered in the field. Winds are not considered because wind conditions, particularly at the firing location, cannot be accurately predicted in advance. Consequently, when a shooter is using trajectory information provided by the computational procedure disclosed herein, the experience of the shooter must be relied on to correct for wind conditions when a target is encountered in the field.

In one exemplary, embodiment, the computational technique disclosed herein utilizes two different computer processors, such as a relatively high-numerical-precision computer processor (referred to herein as a "master processor") and a relatively low-numerical-precision computer processor (referred to herein as a "device processor"). The master processor is used to pre-compute reference trajectory information that is later used by the device processor to provide near real-time (1 second or less) Altitude-Compensated Inclined Shooting (ACAS) trajectory information in the field. Exemplary embodiments of the master processor comprise, but are not limited to, a Personal Computer (PC) or a handheld Personal Digital Assistant (PDA) having ballistics software capable of computing a highly accurate projectile trajectory. Exemplary embodiments of a device processor comprise, but are not limited to, a computer processor device having a limited computation capacity, such as a device mounted to a firearm or a handheld device used by a shooter or a companion of the shooter. In an alternative exemplary embodiment, a single computer processor comprising sufficient computing capability may be used in place of two different computer processors. An exemplary embodiment of such a single computer processor comprises, but is not limited to, a handheld Personal Digital Assistant (PDA) having ballistics software capable of computing a highly accurate projectile trajectory. It should understood that the computer processors referred to herein generally include components and capability for providing functionality, such as, but not limited to, input/output (I/O), storage, power, etc.

Because the trajectory information provided by the computational procedure applies to a single cartridge, the memory storage requirement of the device processor for each cartridge is relatively modest because only reference trajectory information for the particular cartridge needs to be stored for the device processor. If reference trajectory information for multiple cartridges is desired, the reference trajectory information for each desired cartridge is generated by the master processor by repeating the computational procedure for each desired cartridge and then transferring the different reference trajectory information for each cartridge to the device processor. Memory requirements for the device processor would accordingly increase based on the number of desired cartridges. In the field, the reference trajectory information is then accessed by an operator through the device processor. The computational procedure performed by the device processor for determining an ACIS trajectory is the same regardless which cartridge is being used.

In an alternative exemplary embodiment, all computations are performed by a master-processor-type computer processor, such as a handheld Personal Digital Assistant (PDA) having ballistics software capable of computing a highly accurate projectile trajectory. For this alternative exemplary embodiment, reference trajectory information is computed prior to firing in the field, and then accessed in the field for computing an ACIS trajectory for a selected cartridge.

Figure 6:
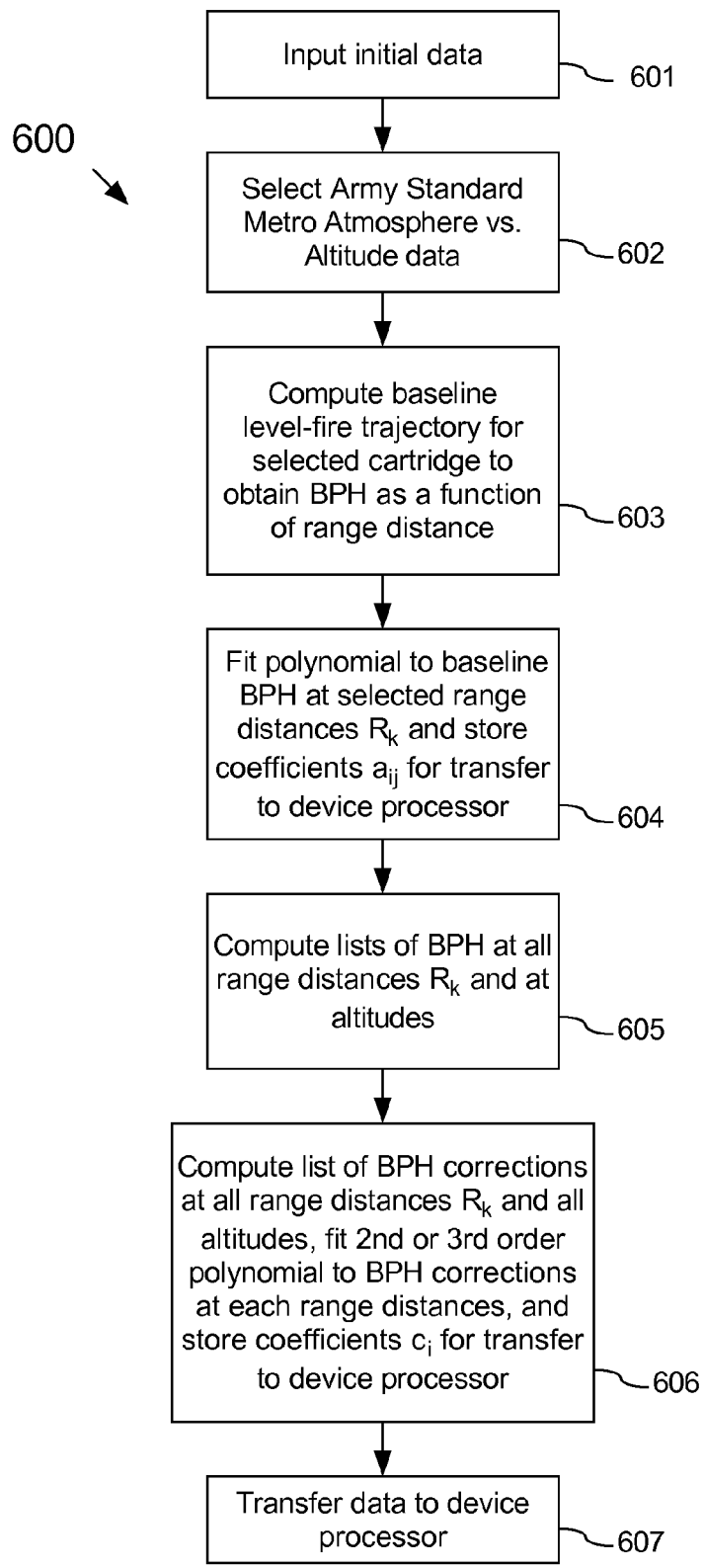
FIG. 6 depicts a flow diagram for one exemplary embodiment of operations and a computational process performed by a master processor for generating reference trajectory information for computing Altitude-Compensated Inclined Shooting (ACIS) trajectory information for a selected cartridge according to the subject matter disclosed herein, the ACIS method being an alternative to the equivalent horizontal range method for generating reference trajectory information.

FIG. 6 depicts a flow diagram 600 for one exemplary embodiment of operations and a computational process performed by a master processor for generating reference trajectory information for computing Altitude-Compensated Inclined Shooting (ACS) trajectory information for a selected cartridge. Computations are initiated at 601 by, for example, a user inputting and/or selecting from a menu the initial data comprising (1) the specific projectile for which the computations will be performed; (2) the ballistic coefficient(s) for the projectile and the projectile speed range within which each ballistic coefficient value applies; (3) the muzzle velocity (i.e., the speed of the projectile when the projectile leaves the muzzle of the firearm); (4) the zero-range distance for which the firearm has been or will be sighted-in; (5) the maximum range distance for which trajectory computations are to be performed (normally the maximum effective range distance for the cartridge); (6) the range-distance increment (RDI) (e.g., 50 yards or meters for a high powered cartridge) at which trajectory parameters will be outputted, listed, and/or stored for the projectile; (7) the sight height of the firearm (i.e., the perpendicular distance of the line of sight through the sighting device on the firearm above the bore centerline; and (8) the physical units in which trajectory parameters will be expressed (i.e., all English units, all metric units, or "mixed" units in which range distances are expressed in meters and all other parameters are expressed in English units). The following description uses English units, but it should be understood that metric or mixed units could also be used.

At 602, the Army Standard Meteorological conditions are selected for all computations that will be performed. In one exemplary embodiment, the Army Standard Metro conditions are preloaded into the master processor before computations can begin. In another exemplary embodiment actual atmospheric conditions can be selected and, for example, manually entered when atmospheric conditions can be practically predicted in advance of going into the field. At sea level, the meteorological conditions are 750 mm (29.5275 in) of mercury atmospheric pressure, 15C (59F) atmospheric temperature, and 78% relative humidity. The pressure and temperature at higher altitudes decrease in accordance with tables listed in the publications referred to previously. The value of relative humidity normally is not changed as altitude changes because relative humidity has a small effect on air density at sea level, and as altitude increases, the vapor pressure of water in the atmosphere decreases, leading to an even smaller effect caused by relative humidity. A standard value of gravitational acceleration of 32.174 ft/sec² adjusted for altitude at the firing point is also used in all computations.

At 603, a baseline trajectory is computed for the selected projectile. The baseline trajectory is a level-fire (zero-inclination angle) trajectory at sea-level standard conditions between the muzzle of the firearm and the maximum-range distance (entered at 601). The parameter of interest is the Bullet Path Height (BPH) of the projectile versus range distance from the muzzle. BPH is defined herein as the perpendicular distance of the projectile from the extended line of sight through the sighting device on the firearm. It should be understood that BPH is not the Drop of the projectile. For a level-fire trajectory, Drop is defined herein as the distance of the bullet from a level line between the muzzle of the firearm and a target located in a level plane with the firearm. As defined herein, BPH is positive when the projectile is above the line of sight and negative when the projectile is below the line of sight. The positive or negative sign of BPH allows an operator to know where the projectile will pass with respect to the extended line of sight through the sighting device on the firearm.

Both BPH and Drop are routinely calculated by software that computes trajectories for projectiles in fast and high numerical-precision computers, such computer processors like the master processor. An example of such software is the Sierra Infinity software, which is available from Sierra Bullets, Sedalia, Mo. For a level-fire trajectory, BPH and Drop at any given range distance are related by an algebraic equation so that only one variable need be known for the purposes of the computational process disclosed herein. For illustrative purposes, BPH is used in the following description. The zero-range distance $R_Z$ selected for the firearm and the Drop $D_Z$, at that specific range distance are stored in the master processor for later transfer to the device processor.

At 604, having BPH versus range distance at selected ranges (e.g., every 50 yards) between the muzzle of the firearm and the maximum-range distance, the master computer fits (either internally or by using a separate external software program) a polynomial expression to the BPH versus range distance, such as by using the least squares method of fit. According to one exemplary embodiment, the standard deviation of the fit should be no greater than 0.5 inch. In one exemplary embodiment, a seventh-order polynomial is sufficient for most projectile trajectories. If the trajectory is very flat, a lower-order polynomial could be sufficient. For trajectories that are more steeply curved, especially near the end of the trajectory, or to reduce the number of terms in the fit polynomials to simplify the computations, sequential sectors of the trajectory may be specified, and a different fit polynomial may be used in each sector. In one exemplary embodiment, no more than three sectors are necessary, but in alternative exemplary embodiments, a greater or lesser number of sectors could be used without restriction. For a seventh-order polynomial, the reference Bullet Path (BP) polynomial for any sector will be:

$$BP(R) = a_{i0} + a_{i1}R + a_{i2}R^2 + a_{i3}R^3 + a_{i4}R^4 + a_{i5}R^5 + a_{i6}R^6 + a_{i7}R^7 \quad (2)$$

in which, i is an index indicating the trajectory segment of the fit (i=1, 2, or 3); and R is the range distance.

In one exemplary embodiment, the summation is over all eight terms in the polynomial expansion. In an alternative exemplary embodiment, the summation is over fewer terms of the polynomial expansion. The polynomial fit operation yields the eight (or fewer) coefficients $a_{ij}$ in which j=0, 1, 2, . . . , 7) of the polynomial fit in each sector of the baseline trajectory. The coefficients $a_{ij}$ are stored for subsequent transfer to the device processor. In the explanation that follows, the seventh-order polynomial of Equation (2) will be used.

At 605, the next group of computations performed by the master processor takes place at a specific set of range distances from the firearm, that is, at each range-distance increment (RDI) between the maximum range distance of the trajectory back to a range distance that is one range-distance increment RDI beyond the zero-range distance $R_Z$ of the firearm. For example, if the maximum range distance is 800 yards, the $R_Z$ is 200 yards, and the RDI is 50 yards, trajectory calculations take place at range distances of 800, 750, 700, 650, 600, . . . , down to 250 yards, resulting in calculations at twelve specific range distances. The specific range distances are designated by $R_k$ in the following explanation. At each such specific range distance, the master processor uses the specified zero-range distance $R_Z$ with no adjustment in sight settings to compute the BPH for shooting at sea level altitude, at 2000 feet above sea level (ASL), at 4000 feet ASL, at 6000 feet ASL, at 8000 feet ASL, at 10000 ASL, and at 12000 feet ASL. The trajectory calculated for shooting at sea level is used as the baseline reference trajectory. This observation is crucial; the shooter always uses a specific value of zero-range distance $R_Z$ (e.g., 200 yards) regardless of the altitude at which he or she zeroes-in the firearm.

The maximum shooting altitude anticipated for zeroing-in and/or shooting in the field is selected for the present explanation to be 12000 feet ASL. It should be understood that in an alternative exemplary embodiment, the maximum shooting altitude could be selected to be different from 12000 feet ASL, in which case the maximum altitude would be appropriately adjusted for the anticipated shooting situation in the field. Normally, for practical reasons one exemplary embodiment of the software in the master processor will be limited to a maximum altitude of 15000 feet ASL. For the present exemplary embodiment, an altitude separation of 2000 feet is used. It should be understood that in an alternative exemplary embodiment, a different altitude separation could be used, such as a value that is less than 2000 feet, in yet another exemplary embodiment, the attitude separation value could vary, that is, not be a constant value.

The computations at 605 result in a set of seven (or fewer depending on the maximum shooting altitude and the altitude separation value) Bullet Path (BP) values at each range distance from one range-distance increment (RDI) beyond $R_Z$ out to the maximum range specified for the projectile. Note that no polynomial fits are required for the trajectories computed at 605. The results of the computations are a set of seven (or fewer) Bullet Path (BP) values at each specific range distance $R_k$ chosen for the evaluation. Each such computation is based on zeroing-in (sighting-in) the firearm at sea level and then shooting at each altitude of the list without any sight changes to compensate for the altitude changes.

At 606, the master processor calculates a set of BPH Corrections at each specific range distance $R_k$ and each altitude. This is done by designating the BPH for each range distance $R_k$, at sea level and at each altitude above sea level (ASL) as:

$BP_0(R_k)$=BPH at $R_k$ fired at sea level;

$BP_{2000}(R_k)$=BPH at $R_k$ fired at 2000 feet ASL;

$BP_{4000}(R_k)$=BPH at $R_k$ fired at 4000 feet ASL;

$BP_{6000}(R_k)$=BPH at $R_k$ fired at 6000 feet ASL;

$BP_{8000}(R_k)$=BPH at $R_k$ fired at 8000 feet ASL;

$BP_{10000}(R_k)$=BPH at $R_k$ fired at 10000 feet ASL; and $BP_{12000}(R_k)$=BPH at $R_k$ fired at 12000 feet ASL. (3)

The left side of Equations (3) are the Ballistic Path Heights for trajectories in which the firearm is sighted-in at sea level, then later fired at the specified altitudes and evaluated at the range distance $R_k$. The Bullet Path Height Correction $BPcorr(R_k)$ at range distance $R_k$ and at each altitude is given by the following arithmetic operations of Equation (4):

$BPcorr_0(R_k)$=0;

$BPcorr_{2000}(R_k)=BP_{2000}(R_k)-BP_0(R_k)$;

$BPcorr_{4000}(R_k)=BP_{4000}(R_k)-BP_0(R_k)$;

$BPcorr_{6000}(R_k)=BP_{6000}(R_k)-BP_0(R_k)$;

$BPcorr_{8000}(R_k)=BP_{8000}(R_k)-BP_0(R_k)$;

$BPcorr_{10000}(R_k)=BP_{10000}(R_k)-BP_0(R_k)$;

$BPcorr_{12000}(R_k)=BP_{12000}(R_k)-BP_0(R_k)$; (4)

As shown by Equation (4), the Bullet Path Height Correction BPcorr at each firing altitude and at the specific range distance $R_k$ is the difference between the BPH at which the projectile is fired and the BPH of the projectile when sighted-in at sea level. The Bullet Path Height Correction BPcorr is applied to the Bullet Path Height BPH of the reference trajectory at the range distance $R_k$. If the projectile were to be fired at sea level, the correction for altitude would be zero at all range distances because the reference trajectory is the actual trajectory at that (zero) altitude.

A set of specific range distances $R_1, R_2, R_3, \ldots, R_K$ is chosen so that each range point $R_k$ corresponds to one of the output points for the computations of Equation (2). Then $R_1=R_Z+RDI$ $R_2=R_1+RDI$ $R_3=R_2+RDI$

. . .

$R_K=R_{K-1}+RDI$ (5)

in which, $R_K$ equals the maximum range distance for the trajectory computation.

The sequence starts one range-distance increment (RDI) beyond the zero-range distance $R_Z$ because the projectile trajectory rises only a little above the line of sight at points between the muzzle and the zero-range distance $R_Z$. This is because the zero-range distance $R_Z$ for the firearm is chosen so that a target miss will not occur for a direct aim at a target closer than $R_Z$. For an "inclined target" elevated or depressed relative to the firing point, the projectile trajectory is flatter than it is for zero inclination, and no BPcorr is needed for target distances less than $R_Z$.

The computations of the equations of Equation (5) result in a list of BPcorr values at each specified range distance $R_k$ and at each altitude chosen for evaluation. The actual number of such lists for each altitude is given by:

$$K = \frac{R_k - R_Z}{RDI} \quad (6)$$

At this point in the computations, a second-order, or at most a third-order, polynomial is fitted to the BPcorr values versus altitude in the list above resulting in a polynomial of the form:

$$BPcorr(R_k, alt) = c_{1k}(R_k)x(alt) + c_{2k}(R_k)x(alt)^2 + c_{3k}(R_k)x(alt)^3 \quad (7)$$

Equation (7) expresses the Bullet Path Height Correction BPcorr at a specific range distance $R_k$ and any altitude (alt) as a power series in which the coefficients $c_{nk}(R_k)$ change values at each specific range distance $R_k$. The initial value $c_{0k}(R_k)$ usually appearing in the polynomial of Equation (7) is always 0 because the Bullet Path Height Corrections for zero altitude are zero at all range distances. If only a second-order polynomial is necessary (which is usually the case), then the third term on the right side of Equation (7) does not appear. There would then be K such polynomials for a given projectile. For the present example in which the maximum-range distance $R_K$ is 800 yards, the zero range distance $R_Z$ is 200 yards, and the range-distance increment RDI is 50 yards, there would be twelve polynomials of the form of Equation (7) to characterize the BPcorr at 800, 750, 700, 650, . . . , down to 250 yards (or meters): That is, $$K = \frac{800 - 200}{50} = 12. \quad (8)$$

At this point, the calculations performed by the master processor have been completed. The coefficients $a_{ij}$ in Equation (2) and the K sets of coefficients $c_1(R)$, $c_2(R)$, and $c_3(R)$ for Equation (7) are stored for later transfer to the device processor at 607 at a convenient time.

Few shooters sight in exactly at sea level. A shooter normally sights-in a firearm at a convenient location at some altitude, referred to herein as the zero-point altitude ($alt_{ZP}$), which is almost always above sea level. Then, in the field the shooter fires at a target at yet a different altitude, referred to herein as firing-point altitude ($alt_{FP}$) if the shooter has a reference trajectory computed for sea level, two Bullet Path Height corrections BPcorr are necessary to modify the reference trajectory to predict the projectile impact point at the field location:

The first correction modifies the sea level reference trajectory to the altitude $alt_{ZP}$ at which the shooter sighted in. The second correction modifies the reference trajectory for the altitude $alt_{FP}$ at which the shooter must fire. It has been determined that the net Bullet Path Height Correction BPcorr for any two altitudes and any range distance to the target can be computed from:

$$BPcorr(net) = BPcorr(R_T, alt_{FP}) - BPcorr(R_T, alt_{ZP}) \quad (9)$$

in which, $R_T$ is the target range distance with respect to the firing point;

BPcorr($R_T$, $alt_{ZP}$) is the Bullet Path Height correction BPcorr evaluated at $alt_{ZP}$, the sighting-in location altitude and target range distance $R_T$, evaluated by Equation (7) above; and BPcorr($R_T$, $alt_{FP}$) is the Bullet Path Height correction BPcorr evaluated at $alt_{FP}$, the firing point altitude, and the true target range distance $R_T$ evaluated by Equation (7) above.

This crucial Equation (9) reflects an observation that the net Bullet Path Height Correction for zeroing-in at a first altitude and then firing at a second altitude is the negative of the correction obtained for zeroing-in at the second altitude and then firing at the first altitude. Thus, Equation (9) is correct for all altitude situations.

The net Bullet Path Height Correction BPcorr(net) of Equation (9) is applied to the original reference projectile trajectory at range distance $R_T$ to calculate the correct Bullet Path Height BPH for the target at the firing location.

Note that Equations (7) and (9) are evaluated for a level-fire situation, as if the target were at a distance $R_T$ in the same level plane as the muzzle of the firearm. The target may in fad be inclined at some angle $\alpha_T$ (positive upward or negative downward) relative to the firing point. It has been shown in "Inclined Fire," W. T. McDonald, 2003, available from sierrabullets.com, that the correct Bullet Path Height BPH for an inclined target can be computed from the level-fire trajectory. The appropriate equation is:

$$BPinclined(R_T, \alpha_T) = BPlevel(R_T)\cos \alpha_T - (1.0 - \cos \alpha_T)[h_S + (R_T/R_Z)(D_Z - h_S)] \quad (10)$$

in which, BPinclined($R_T$, $\alpha_T$) is the Bullet Path Height BPH for a target at straight line range distance $R_T$ and inclination angle $\alpha_T$ on the inclined trajectory;

BPlevel($R_T$) is the Bullet Path Height BPH computed as if the target were at the same range distance $R_T$ in a level-fire situation;

$h_S$ is the sight height above the bore centerline (always positive for a sighting device mounted above the bore);

$R_Z$ is the zero range distance for the firearm; and $D_Z$ is the Drop for the reference trajectory at the zero range distance $R_Z$ (available from the calculation of the reference trajectory in the master processor).

Equation (10), when processed in a device-processor-type computer processor, is an excellent approximation with accuracy well within 1.0 minute of angle (MoA) for range distances within the maximum effective range of high powered cartridges. Note that $R_Z$ and $D_Z$ are fixed for a given projectile and are also transferred from the master processor to the device processor. With the definitions and equations above, the computations performed by the device processor are little more than arithmetic. The trigonometric cosine function must either be available in the device processor, or a table of cosine values must be available fix the device processor for angle range of 0 degrees to 70 degrees.

Figure 7:
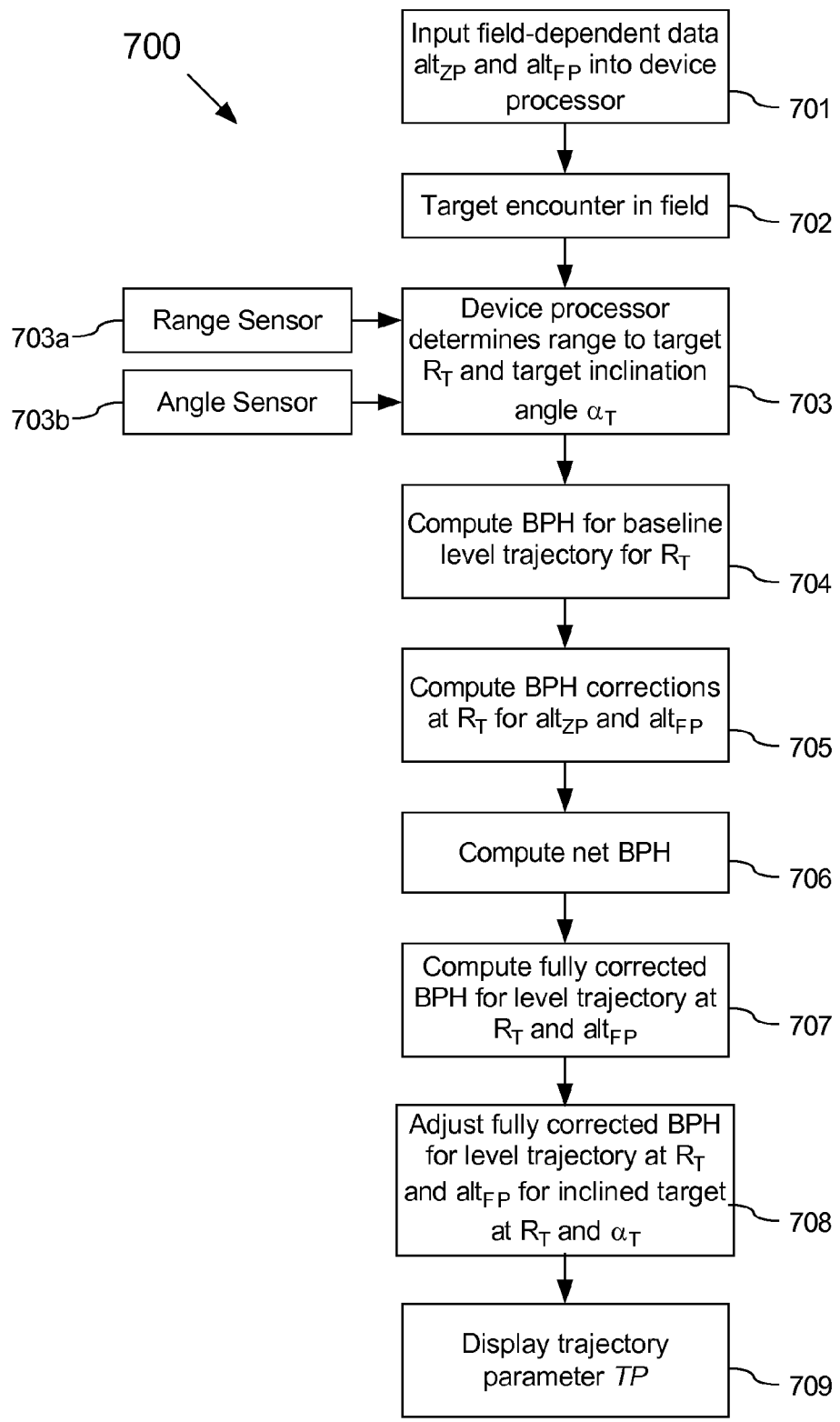
FIG. 7 depicts a flow diagram for one exemplary embodiment of operations and computational process performed by a device processor for generating Altitude-Compensated Inclined Shooting (ACIS) trajectory information for a selected cartridge according to the subject matter disclosed herein.

FIG. 7 depicts a flow diagram 700 for one exemplary embodiment of operations and computational process performed by a device processor for generating Altitude-Compensated Inclined Shooting (AGES) trajectory information for a selected cartridge. In one exemplary embodiment, results of the ACES trajectory information computations performed by the master processor would have been transferred to the device processor at 607 in FIG. 6. As such, the computations performed by the master processor operations need not occur in real time and could occur in a remote location in advance of a user venturing into the field because the computations depend only on well-known characteristics of the firearm and ammunition and standard atmospheric conditions. The transferred reference trajectory information comprises:

(1) the coefficients $a_{ij}$ of the reference trajectory Bullet Path Height BPH from Equation (1);

(2) the range distance boundaries of the sectors i of the reference trajectory within which specific $a_{ij}$ coefficients apply;

(3) the list of BPcorr coefficients $c_{1k}$, $c_{2k}$, and $c_{3k}$ for each of the k range distance points $R_k$;

(4) the zero-range distance $R_Z$ from Equation (10);

(5) the projectile Drop at the zero-range distance $D_Z$ from Equation (10); and (6) the sight height of the firearm $h_S$ from Equation (10).

At 701, before venturing into the field, the field-dependent data for generating Altitude-Compensated Inclined Shooting (ACIS) trajectory information for a selected cartridge is input into the device processor. In particular, the altitude at which the firearm was sighted-in, $alt_{ZP}$, and the altitude of the firing point in the field, $alt_{FP}$, are manually input the device processor. The altitude $alt_{ZP}$ could be entered into the device processor when the firearm is sighted-in, and then stored in, for example, long-term memory associated with the device processor. Alternatively, could be entered into the device processor when the results of the computations performed by the master processor information are transferred into the device processor. In either case, $alt_{ZP}$ must be entered before computations can begin at the firing point. The altitude of the firing point $alt_{FP}$ normally is entered at the time of or just prior to, encounter with a target at 702. In situations in which a shooter can predict where the target encounter will take place, the firing point altitude $alt_{FP}$ may be entered into the device processor prior to venturing into the field. The subsequent calculations will be accurate provided that the ultimate firing point does not significantly depart (about ±300 feet AST) from the predicted firing point when the target is encountered in the field.

At 703, when a target is encountered, the shooter initiates ACIS trajectory computations. The device processor communicates with sensors measuring the direct (straight line) target range distance $R_T$ (i.e., from a rangefinder) at 703a, and the target inclination angle $\alpha_T$ (i.e., from an inclinometer) at 703b. This communication may take place either (1) automatically electronically, or (2) via manual input by the shooter.

At 704, the device processor computes the Bullet Path Height BPH values for the target-range distance $R_T$ on a level-fire trajectory using the polynomial Equation (2) with the values of the coefficients $a_{ij}$ transferred from the master processor at 607 in FIG. 6. The device processor first determines the trajectory sector i in which the target lies by comparing $R_T$ with the range distance boundaries transferred from the master processor, then selecting the set of $a_{ij}$ coefficients for that sector to perform the computations.

In the situation in which the device processor has limited numerical precision, Equation (2) can be reformulated as a "nested polynomial" for the evaluation computations in the following form:

$BP(R_T)=a_{i0}A_1$ $A_1=1+(a_{i1}/a_{i0})R_T A_2$ $A_2=1+(a_{i2}/a_{i1})R_T A_3$ $A_3=1+(a_{i3}/a_{i2})R_T A_4$ $A_4=1+(a_{i4}/a_{i3})R_T A_5$ $A_5=1+(a_{i5}/a_{i4})R_T A_6$ $A_6=1+(a_{i6}/a_{i5})R_T A_7$ $A_7=1+(a_{i7}/a_{i6})R_T$ (11)

The computation of $BP(R_T)$ begins with the calculation of $A_7$, then proceeds to $A_6$, then to $A_5$, and so forth, to the final calculation of $BP(R_T)$. Each computation includes a truncation error based on the limited numerical precision of the device processor. Accordingly, in the calculation sequence of Equation (11), truncation errors occur systematically from the smallest numerical result to the largest, so that overall truncation error in $BP(R_T)$ is thereby minimized. The sequence of Equation (11) also limits the number of multiplications that are performed because $R_T$ is not raised to powers greater than 1 in any calculation.

At 705, the device processor calculates the (fully corrected) BPcorr for a target at range distance $R_T$ for a level-fire trajectory by first determining between which pair of specific range distances, $R_{k-1}$ and $R_k$ the value $R_T$ lies by, for example, the following sequence of tests:

Is $R_T>R_1$? If no, then $R_{k-1}=R_Z$, and $R_k=R_1$. If yes, then:

Is $R_T>R_2$? If no, then $R_{k-1}=R_1$, and $R_k=R_2$. If yes, then:

Is $R_T>R_3$? If no, then $R_{k-1}=R_2$, and $R_k=R_3$. If yes, then:

...

Is $R_T>R_{K-1}$? If no, then $R_{k-1}=R_{K-2}$, and $R_k=R_{K-1}$. If yes, then:

$R_{k-1}=R_{K-1}$, and $R_k=R_K$. (12)

Note that the sequence of tests of Equation (12) presumes that (a) no target-range distance is less than the zero-range distance $R_Z$ (if so, the shooter will simply fire directly at the target), and (b) that no target-range distance is greater than the maximum range distance $R_K$ specified for the firearm. If necessary, tests can be incorporated in the device processor software to assure that these two presumptions are true.

With the specific range distances $R_{k-1}$ and $R_k$ known between which $R_T$ lies, at 706 the device processor next computes the Bullet Path Height Correction $BPcorr(R_{k-1}, alt_{ZP})$ at range distance $R_{k-1}$ and the altitude $alt_{ZP}$ at which the firearm was sighted in. This computation uses Equation (7) and the list of the coefficients $c_{1k}$, $c_{2k}$, and $c_{3k}$ transferred from the master processor. If necessary to preserve computational precision in the device processor, Equation (7) may be reformulated as a nested polynomial using the procedure outlined for Equation (11). Computation as a nested polynomial is directly followed by the computation of the Bullet Path Height Correction $BPcorr(R_k, alt_{ZP})$ at the specific range distance $R_k$ and the altitude $alt_{ZP}$ at which the firearm was sighted in. Then, because $R_T$ lies between $R_{k-1}$ and $R_k$, the $BPcorr(R_k, alt_{ZP})$ is computed by linear interpolation:

$$BPcorr(R_T, alt_{ZP}) = BPcoor(R_{k-1}, alt_{ZP}) + \frac{R_T - R_{k-1}}{R_k - R_{k-1}}[BPcorr(R_k, alt_{ZP}) - BPcorr(R_{k-1}, alt_{ZP})] \quad (13)$$

The device processor also computes at 705 $BPcorr(R_k, alt_{FP})$ at the target range distance $R_T$ and the firing point altitude $alt_{FP}$ using the same procedure as for Equation (13), thereby yielding:

$$BPcorr(R_T, alt_{FP}) = BPcorr(R_{k-1}, alt_{FP}) + \frac{R_T - R_{k-1}}{R_k - R_{k-1}}[BPcorr(R_k, alt_{FP}) - BPcorr(R_{k-1}, alt_{FP})] \quad (14)$$

At 706, the net Bullet Path Height Correction is calculated using Equation (9) above:

$BPcorr(net)=BPcorr(R_T,alt_{FP})-BPcorr(R_T,alt_{ZP})$ (15)

At this point, the result of Equation (15) is the net Bullet Path Height Correction for a firearm and cartridge zeroed-in at an altitude $alt_{ZP}$ and then fired at an altitude $alt_{FP}$ at a fictitious or theoretical target situated at a range distance $R_T$ in a plane level with the firing point. At 707, the net correction BPcorr(net) is added to the Bullet Path Height $BP(R_T)$ computed earlier for the target; range distance R from the range-distance sensor shown in FIG. 7. That is:

$BPlevel(R_T)=BP(R_T)+BPcorr(net)$ (16)

At 708, the final computation in the device processor adjusts the result of Equation (16) for an inclined target at the same distance $R_T$ and inclination angle $\alpha_T$ relative to the firing point. The final result is:

$$BPinclined(R_T, \alpha_T) = \qquad (17)$$

$$BPlevel(R_T) \times \cos\alpha_T - (1 - \cos\alpha_T)\left[h_s + \frac{R_T}{R_Z}(D_Z - h_s)\right]$$

It remains only for the device processor to display the ACIS holdover information to the shooter at 709. The holdover will be the negative of the adjusted Bullet Path Height BPH for the inclined target because, because the projectile will be below the line of sight at range distances beyond the zero-range distance $R_Z$, the shooter must aim high by an equivalent deflection at the target. Elevation adjustments may be made by the shooter based on the displayed ACIS information.

A skilled mathematician will note that alternative mathematical implementations may be used to accomplish the detailed computations described above. All such alternatives are included herein. It is imperative, however, that the two crucial characteristics of this computation method be preserved by whatever mathematical implementation is used. The first characteristic is that the same zeroing-in range distance $R_Z$ is used at all altitudes. This is a practical convenience to the shooter as well as essential to the mathematics; the shooter need not attempt to adjust the zeroing-in operations for the altitude of the zeroing-in location. The second characteristic is the use of Equation (9) to compute the net Bullet Path Height Correction IsTcorr to add to the Bullet Path Height value on the reference trajectory at target range distance $R_T$.

Figure 8:
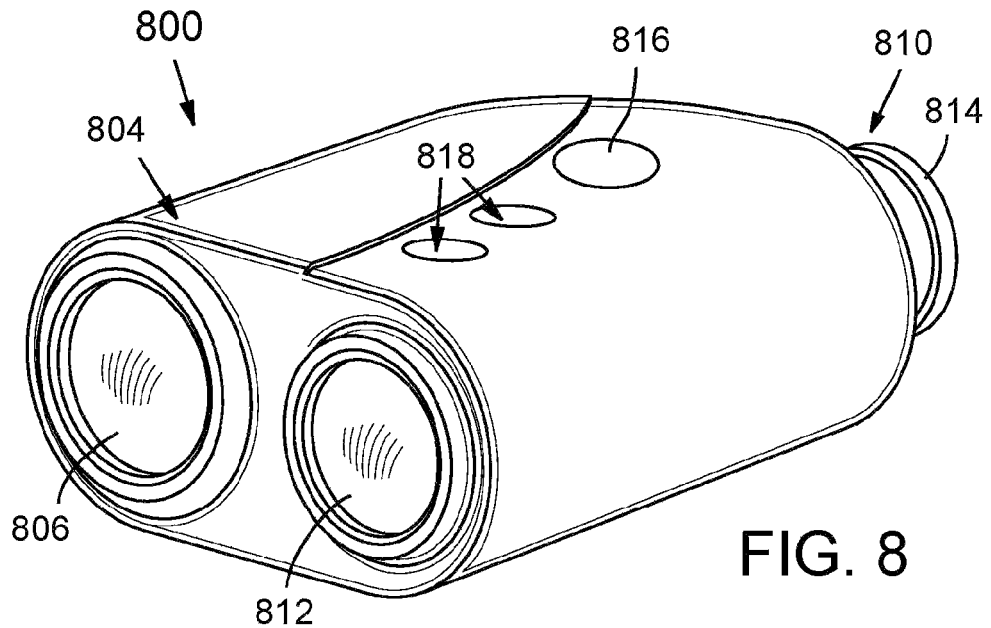
FIG. 8 depicts an exemplary embodiment of a portable handheld rangefinder that generates Attitude-Compensated Inclined Shooting (ACIS) trajectory information for a selected cartridge.

The above-described methods may be implemented in a portable, handheld laser rangefinder 800, an exemplary embodiment of which is depicted in FIG. 8. The exemplary embodiment of rangefinder 800 includes a laser ranging system 804 having a lens 806 through which a laser beam is emitted and reflected laser light is received for determining a range to a distant target. Rangefinder 800 also includes an integrated optical targeting sight 810 comprising an objective 812 and an eyepiece 814, through which a user views the target. In one exemplary embodiment, rangefinder 800 comprises a power button 816 that turns on certain electronics of rangefinder 800 and causes rangefinder 800 to emit laser pulses and acquire range readings. A pair of menu interface buttons 818 may be provided on rangefinder 800 for operating menus for inputting setup information and enabling functions of the rangefinder, similar to that described in U.S. Patent Application Publication No. 2007/0097351 A1 to York et al., the disclosure of which is incorporated herein by reference. It should be understood that other alternative exemplary embodiments of a portable handheld laser rangefinder are possible.

Figure 9:
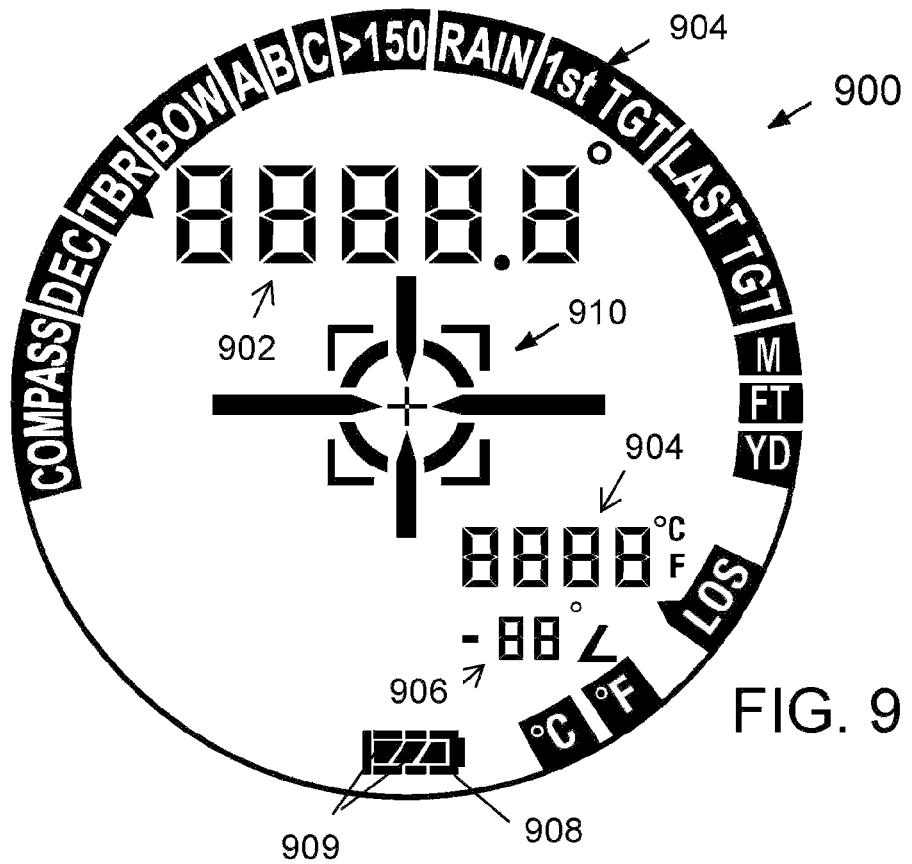
FIG. 9 depicts an enlarged view of an exemplary embodiment of an electronic display as viewed through an eyepiece of the exemplary portable handheld rangefinder depicted in FIG. 8.

FIG. 9 depict one view of elements of an exemplary display 900 which, in one exemplary embodiment of rangefinder 800, may be placed in the field of view of the targeting sight 810 of rangefinder 800. In one exemplary embodiment, display 900 comprises a transmissive LCD display panel placed between objective 812 and eyepiece 814. Other display devices, however, may be used, including displays generated outside of the optical path of the targeting sight 810 and injected into the optical path of the targeting sight 810, such as by projecting a reticle display onto a prism or beam-combining element (reverse beam splitter). In one exemplary embodiment, display 900 may comprise a circular menu 904 along its perimeter, which can be navigated using buttons 816, 818 to select one or more of various functions of rangefinder 800. The exemplary icons labeled >150, 1st TGT, LAST TGT, M/FT/YD, LOS relate to ranging functions and/or modes of display. In one exemplary embodiment, the exemplary TBR icon may stand for TRUE BALLISTIC RANGE and, when selected, activates calculation methods for determining ACIS holdover or the Equivalent Horizontal Range (also known as the TRUE BALLISTIC RANGE). In one exemplary embodiment, the exemplary icon for BOW toggles between bullet calculations (FIGS. 4, 6 and 7) and arrow calculation (FIG. 5), and between ballistic groupings for bullets and arrows, which are selectable from the menu segments of the exemplary A/B/C menu icon.

One exemplary embodiment of display 900 may also comprise a data display 910 including a primary data display section 902 and a secondary data display section 904. Primary data display section 902 may be used to output EHR calculations, as indicated by the adjacent exemplary icon labeled "TBR". Secondary numerical display 904 may be used to output the LOS range, as indicated by the adjacent exemplary icon labeled "LOS". A third data display section 906 may be provided for displaying an inclination angle, measured by an inclinometer sensor 1008 (FIG. 10) of rangefinder 800. Still further exemplary display sections may be provided for displaying data representative of a trajectory parameter, such as ballistic path height BP, vertical ballistic drop, ACIS information, energy, momentum, velocity, etc., at the target range. In one exemplary embodiment, based on ballistic path height BP or another trajectory parameter TP, another display section (not shown) may display a recommended holdover adjustment in inches, millimeters or mils, at the target range or a recommended elevation adjustment in MOA or mils.

A battery power indicator 908 may be included in exemplary display 900 for indicating an estimate of the amount of battery power remaining. One or more display, segments 909 in the center of the battery power indicator 908 may be turned of to indicate the remaining battery power. A user-configurable targeting reticle display 910 may also be included in exemplary display 900 for facilitating aiming of rangefinder 800. In one exemplary embodiment, exemplary reticle display 910 comprises a plurality of segments that allow exemplary reticle display 910 to be reconfigured in various ways.

Figure 10:
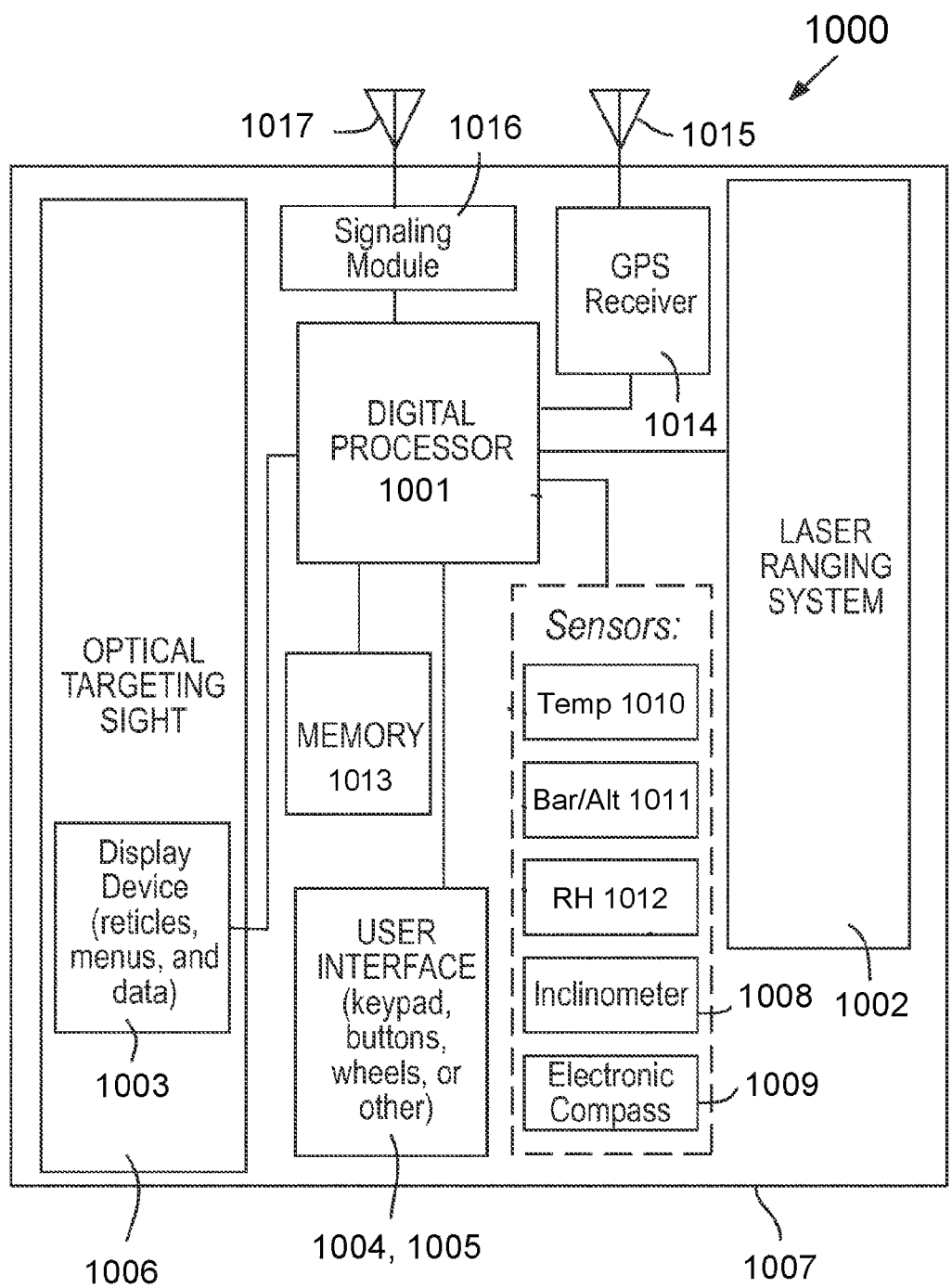
FIG. 10 depicts an exemplary block diagram for an exemplary embodiment of rangefinder device according to the subject matter disclosed herein.

FIG. 10 depicts an exemplary block diagram for an exemplary embodiment of rangefinder device 1000 according to the subject matter disclosed herein. In one exemplary embodiment, rangefinder device 1000 could be configured similar to the exemplary portable, handheld rangefinder device depicted in FIG. 8. In another exemplary embodiment, rangefinder device 1000 could be configured to be part of or communicatively coupled to an exemplary telescopic sighting device 1100 depicted in FIG. 11. Rangefinder device 1000 comprises a computer processor or digital processor 1001, such as a microprocessor or digital signal processor (DSP), operatively coupled to laser ranging system 1002, display device 1003, and user interface 1004, 1005. Targeting sight 1006 and laser ranging system 1002 are aligned relative to each other and are supported in a common housing 1007, which may include an internal carriage or frame. An inclinometer sensor 1008 is mounted to a support structure in rangefinder device 1000 in alignment with ranging system 1002 and targeting sight 1006 for measuring the inclination angle θ of the line of sight (LOS)

between a vantage point VP and a target T (FIG. 2). The ballistic calculations described above with reference to FIGS. 1-7 may be performed by digital processor 1001 of rangefinder device 1000 automatically after a laser ranging measurement has been made by ranging system 1002.

To facilitate accurate ballistics calculations, digital processor 1001 is in communication with inclinometer 1008 and other sensors, such as an electronic compass 1009, a temperature sensor 1010, a barometer/altimeter sensor 1011, and/or a relative humidity sensor 1012. The data from the sensors may be used as shooting-condition inputs to ballistic calculation software operating on digital processor 1001 for performing the methods described above with reference to FIGS. 1-7. In one exemplary embodiment, a memory 1013 readable by digital processor 1001 stores a software program, sensor data, and/or user-defined settings, among other information. In one exemplary embodiment, memory 1013 may also store data tables including ballistic coefficients for various bullets and arrows or groups thereof. In another exemplary embodiment, memory 1013 may store data tables including ballistic tables with predicted trajectory parameters for known shooting conditions (including a range of angles) and tables with EHR data (under level-fire conditions) for a range of trajectory parameters. A GPS receiver 1014 and antenna 1015 for acquiring geographic location data from GPS satellite signals may also be included in rangefinder device 1000 in operative association with digital processor 1001. A signaling module 1016, which may include an antenna 1017, may be coupled to digital processor 1001 for transmitting signals representative of ballistic calculation data calculated by digital processor 1001, such as one or more trajectory parameters, EHR, elevation adjustments and ACIS holdover adjustments.

The output of BR, EHR or ACIS information may be displayed via a graphical representation of a corresponding aiming mark of a weapon aiming device reticle or targeting sight. In one exemplary embodiment of such a display method, an aiming mark of the facsimile reticle corresponding to the output BP, EHR or ACIS data is identified by highlighting, emphasizing, flashing, coloring, or otherwise changing the appearance of the aiming mark to accomplish a graphical display of the recommended aiming point in relation to the overall reticle pattern. The graphical display communicates to the user which of several aiming marks or points on the corresponding riflescope reticle would be recommended for use in holdover aiming of a firearm that is separate from the rangefinder. In another exemplary embodiment, rangefinder device 1000 and a targeting sight are integrated in a common housing with a riflescope or other weapon aiming device, in which the same sighting device and reticle display may be used for aiming rangefinder device 1000 and for aiming the projectile weapon utilizing a graphical holdover aiming display. In still another exemplary embodiment, BR, EHR or ACIS data may be transmitted via wires or wirelessly by signaling module 1016 and antenna 1017 of rangefinder device 1000 for receipt by a riflescope or other aiming device, and subsequent display using a graphical display. Presenting EHR, BP or ACIS information in a graphical display that is a facsimile of reticle of a weapon aiming device may help avoid human errors that could otherwise result from attempting to manually convert numerical BP, EHR or ACIS data or using it to manually determine which of several secondary aiming marks of a riflescope reticle should be used to aim the weapon.

Figure 11:
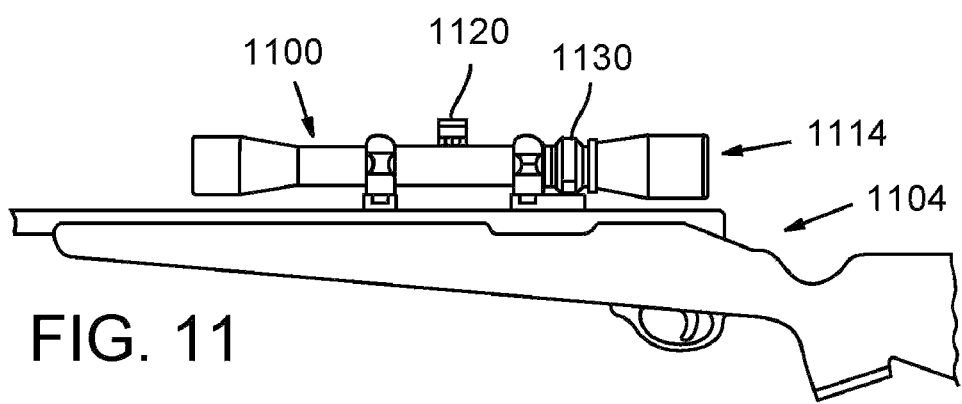
FIG. 11 depicts an exemplary embodiment of a telescopic sighting device for use with the subject matter disclosed herein.

With reference to FIGS. 10 and 11, signaling module 1016 and antenna 1017 of rangefinder device 1000 may be configured to send radio frequency signals to riflescope 1100 mounted on a firearm 1104 or to another weapon aiming device (not shown). Radio signals may be used to wirelessly feed or control a reticle display (not shown) of riflescope 1100 viewable through a riflescope eyepiece 1114 for displaying ballistics data in the field of view and/or for other purposes. Wireless data transmission enables rangefinder device 1000 to be separate from the firearm and protected from the effects of recoil and other harsh environmental conditions to which riflescopes are typically exposed. For example, rangefinder device 1000 may be held by a first person, such as a spotter, positioned several meters away from a shooter holding a rifle 1104 with a riflescope 1100 that receives data wirelessly from rangefinder device 1000. Rangefinder device 1000 may also transmit data wirelessly to several different riflescopes or other devices substantially simultaneously, allowing a single spotter to provide data to a group of shooters.

In one exemplary embodiment, the signals transmitted by signaling module 1016 may include information representative of elevation adjustments to be made in riflescope 1100 (in minutes of angle (MOA) or fractional minutes of angle, such as ¼ MOA or ½ MOA) based on ballistics calculations made by digital processor 1001. Elevation adjustments expressed in MOA or fractions thereof may be displayed in the reticle of riflescope 1100 and/or be effected via a manual adjustment of an elevation adjustment knob 1120, a motorized elevation adjustment mechanism, or by controlling or shifting a reticle display or a reticle of riflescope 1100 for offsetting an aiming mark in the amount of aiming adjustment needed, or to show, highlight, or emphasize a fixed or ephemeral aiming mark corresponding to the EHR or ACIS information calculated by digital processor 1001. The kind of data needed to make such an adjustment or aiming mark may depend on whether the riflescope reticle is in the front focal plane or the rear focal plane of riflescope 1100.

When a recommended elevation adjustment is displayed (in MOA or otherwise) in the reticle display of riflescope 1100, the recommended elevation adjustment may be updated dynamically as the user manually adjusts an elevation setting of riflescope 1100, for example, via an elevation adjustment knob 1120. To enable the recommended elevation adjustment display to be updated dynamically, the elevation adjustment knob 1120 may include a rotary encoder that provides feedback to a display controller of riflescope 1100 or to digital processor 1001. Dynamic updating of the recommended elevation adjustment may enable a reticle display to depict the amount of adjustment remaining (e.g., remaining MOA or clicks of the adjustment knob needed) as the user adjusts elevation, without requiring constant communication between riflescope 1100 and rangefinder device 1000 during the elevation adjustment process. Dynamic updating of the remaining adjustment needed may facilitate operation of rangefinder device 1000 and riflescope 1100 sequentially by a single person. In another exemplary embodiment, rangefinder device 1000 may communicate constantly with riflescope 1100, which may allow two people (e.g., a shooter working with a spotter) to more quickly effect accurate aiming adjustments.

In one exemplary embodiment, signaling module 1016 may include an infrared transceiver, Bluetooth™ transceiver, or other short-range low-power transceiver for communication with a corresponding transceiver of riflescope 1100, for enabling two-way communication while conserving battery power in rangefinder device 1000 and riflescope 1100. Data for controlling a reticle and/or elevation adjustment mechanism 1120 may be transmitted via Bluetooth or other radio-frequency signals. Also, because Bluetooth™ transceivers facilitate two-way communication, the rangefinder device 1000 may query riflescope 1100 for a current elevation adjustment setting, a power adjustment setting, and other information, such as the type of riflescope 1100 and reticle used. This data may then be taken into account in ballistics calculations performed by digital processor 1001. Elevation adjustment and power adjustment settings of riflescope 1100 may be determined, for example, by rotary position sensor/encoders associated with elevation adjustment knob 1120 and power adjustment ring 1130.

In another exemplary embodiment, signaling module 1016 may comprise a cable connector plug or socket for establishing a wired connection to riflescope 1100. A wired connection may avoid the need to have delicate electronics and battery power onboard riflescope 1100. Wired and wireless connections may also be made between signaling module 1016 and other devices, such as bow-sights (including illuminated pin sights and others), PDAs, laptop computers, remote sensors, data loggers, wireless data and telephone networks, and others, for data collection and other purposes.

Holdover indication in a riflescope, bow sight, or other optical aiming device may be achieved by emphasizing an aiming mark of the sight that corresponds to the EHR or ACIS information calculated by rangefinder device 1000. In an exemplary ballistic reticle, a primary aiming mark, which may be formed by the intersection or convergence of a primary vertical aiming line with a primary horizontal aiming line, coincides with a reference sighted-in range (such as 200 yards horizontal). As described above and in U.S. Pat. No. 7,603,804 B2 to Zaderey et al., titled "Ballistic Reticle for Projectile Weapon Aiming Systems and Method of Aiming," the disclosure of which is incorporated herein by reference, secondary aiming marks are spaced along a primary vertical aiming line and identify holdover aiming points at which bullet impact will occur at incremental ranges beyond the sighted-in range.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A method, comprising:
   determining a line-of-sight range from a current vantage point to a target that is elevated or depressed relative to the current vantage point;
   determining an inclination angle of a line of sight between the current vantage point and the target; and
   determining a predicted altitude-compensated inclined shooting trajectory at the line-of-sight range for a preselected projectile based on a difference in altitude between the current vantage point with respect to sea level and an altitude of a sighting-in vantage point with respect to sea level, the sighting-in vantage point being a vantage point at which a projectile weapon shooting the preselected projectile was sighted in.

2. The method according to claim 1, wherein the predicted altitude-compensated inclined shooting trajectory is based on a bullet path height correction between a bullet path height at the current vantage point with respect to sea level and a bullet path height at the sighting-in vantage point with respect to sea level.

3. The method according to claim 2, wherein the bullet path height correction is further based on a range distance to the target from the current vantage point.

4. The method according to claim 2, wherein the bullet path height correction is further based on Army Standard Meteorological Atmosphere information, International Standard Atmosphere information, or actual atmosphere information.

5. The method according to claim 1, wherein the processor is further capable of being configured to determine a holdover or a holdunder corresponding to the predicted altitude-compensated inclined shooting trajectory.

6. The method according to claim 5, further comprising displaying information based on the holdover or the holdunder corresponding to the predicted altitude-compensated inclined shooting trajectory.

7. The method according to claim 1, further comprising calculating an angular elevation adjustment for an aiming device corresponding to the predicted altitude-compensated inclined shooting trajectory.

8. The method according to claim 7, further comprising displaying the angular elevation adjustment representing to the predicted altitude-compensated inclined shooting trajectory.

9. The method according to claim 7, further comprising communicating to a weapon-aiming device a signal representative of the angular elevation adjustment corresponding to the predicted altitude-compensated inclined shooting trajectory.

10. The method according to claim 9, wherein the method is performed by a weapon-aiming device comprising a rangefinder or a riflescope, the rangefinder or the riflescope comprising an automatic elevation adjustment mechanism responsive to the signal representative of the angular elevation adjustment.

11. An article comprising: a computer readable medium having stored thereon instructions that, if executed, result in at least the following:
    determining a line-of-sight range from a current vantage point to a target that is elevated or depressed relative to the current vantage point;
    determining an inclination angle of a line of sight between the current vantage point and the target; and
    determining a predicted altitude-compensated inclined shooting trajectory at the line-of-sight range for a preselected projectile based on a difference in altitude between the current vantage point with respect to sea level and an altitude of a sighting-in vantage point with respect to sea level, the sighting-in vantage point being a vantage point at which a projectile weapon shooting the preselected projectile was sighted in.

12. The article according to claim 11, wherein the predicted altitude-compensated inclined shooting trajectory is based on a bullet path height correction between a bullet path height at the current vantage point with respect to sea level and a bullet path height at the sighting-in vantage point with respect to sea level.

13. The article according to claim 12, wherein the bullet path height correction is further based on a range distance to the target from the current vantage point.

14. The article according to claim 12, wherein the bullet path height correction is further based on Army Standard Meteorological Atmosphere information, International Standard Atmosphere information, or actual atmosphere information.

15. The article according to claim 11, wherein the processor is further capable of being configured to determine a holdover or a holdunder corresponding to the predicted altitude-compensated inclined shooting trajectory.

16. The article according to claim 15, further comprising displaying information based on the holdover or the holdunder corresponding to the predicted altitude-compensated inclined shooting trajectory.

17. The article according to claim 11, further comprising calculating an angular elevation adjustment for an aiming device corresponding to the predicted altitude-compensated inclined shooting trajectory.

18. The article according to claim 17, further comprising displaying the angular elevation adjustment representing to the predicted altitude-compensated inclined shooting trajectory.

19. The article according to claim 17, further comprising communicating to a weapon-aiming device a signal representative of the angular elevation adjustment corresponding to the predicted altitude-compensated inclined shooting trajectory.

20. The article according to claim 19, wherein the instructions are executed by a weapon-aiming device comprising a rangefinder or a riflescope, the rangefinder or the riflescope comprising an automatic elevation adjustment mechanism responsive to the signal representative of the angular elevation adjustment.

* * * * *